United States Patent
Fu

(10) Patent No.: US 9,864,192 B2
(45) Date of Patent: Jan. 9, 2018

(54) IMAGE DISPLAY DEVICE, COMPUTER PROGRAM, AND IMAGE DISPLAY SYSTEM

(71) Applicant: SEIKO EPSON CORPORATION, Tokyo (JP)

(72) Inventor: Guoyi Fu, Vaughan (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/210,593

(22) Filed: Jul. 14, 2016

(65) Prior Publication Data
US 2017/0045736 A1 Feb. 16, 2017

(30) Foreign Application Priority Data
Aug. 12, 2015 (JP) ................................ 2015-159484

(51) Int. Cl.
*G02B 27/00* (2006.01)
*G02B 27/01* (2006.01)

(52) U.S. Cl.
CPC ....... *G02B 27/0093* (2013.01); *G02B 27/017* (2013.01); *G02B 2027/014* (2013.01); *G02B 2027/0138* (2013.01)

(58) Field of Classification Search
CPC ............. G02B 27/0093; G02B 27/017; G02B 2027/014; G02B 2027/0138
See application file for complete search history.

(56) References Cited

U.S. PATENT DOCUMENTS

| 6,160,666 A * | 12/2000 | Rallison | G02B 27/0101 345/7 |
| 2012/0206452 A1* | 8/2012 | Geisner | G02B 27/017 345/419 |
| 2012/0212398 A1* | 8/2012 | Border | G02B 27/017 345/8 |
| 2013/0083003 A1* | 4/2013 | Perez | G06F 3/005 345/419 |
| 2013/0120224 A1* | 5/2013 | Cajigas | G09G 5/00 345/8 |
| 2014/0176418 A1 | 6/2014 | Ramachandran et al. | |

FOREIGN PATENT DOCUMENTS

JP 2007-213407 A 8/2007

* cited by examiner

*Primary Examiner* — Andrew Sasinowski
(74) *Attorney, Agent, or Firm* — Oliff PLC

(57) ABSTRACT

An image display device includes a first inertial sensor, an imaging section, and a calculation section. The calculation section calculates a first spatial relationship between the marker and the imaging section in the case where the imaging section captures an image of a marker presented by a device including a second inertial sensor, and calculates a second spatial relationship between the imaging section and the first inertial sensor based at least on the first spatial relationship, first data and second data, the first data including a first orientation of the first inertial sensor and the second data including a second orientation of the second inertial sensor respectively obtained from the first inertial sensor and the second inertial sensor.

8 Claims, 14 Drawing Sheets

|  | KINDS OF CALIBRATION | EXECUTION ENTITY |
|---|---|---|
| S10 | EACH SENSOR AND CAMERA | FACTORY |
| S20 | OFFLINE | FACTORY OR INDIVIDUAL USER |
| S30 | ONLINE | INDIVIDUAL USER |

FIG. 5

IMAGE DISPLAY DEVICE, COMPUTER PROGRAM, AND IMAGE DISPLAY SYSTEM

BACKGROUND

1. Technical Field

The present invention relates to a technology for an image display device.

2. Related Art

In recent years, technologies referred to as augmented reality (AR) in which information is added by computers to objects in the real space have been noticed. As one of the methods of realizing the augmented reality, see-through display devices that enable the users to view the outside world can be used. JP-A-2007-213407 discloses a head-mounted display device as such a display device.

SUMMARY

Hereinafter, an HMD will be exemplified as an example of a see-through display device. The HMD includes a tracking camera so that an AR function can be supplied. The position of a real object relative to the HMD (or a tracking camera) is detected and tracked through the tracking camera (tracking of a real object by this scheme is referred to as "optical tracking"). The HMD displays a virtual object such as a CG so that the position of the virtual object follows that of the real object. At this time, a user views the virtual object so that the position of the virtual object matches the position of the real object.

The position and pose of the real object in a visual field of the tracking camera are changed not only by a motion of the real object but also by a motion (in particular, rotation) of the head of the user. When an angular velocity of the rotation of the head is fast and/or the angle is large, a time difference (latency) until reflection of changes in the position and pose of the real object to display of the virtual object may become noticeable with only the optical tracking.

Technically, it is easy to cause the time resolution of an inertial sensor to be higher than the time resolution (image frame rate) of a tracking camera. Accordingly, as the countermeasure against latency, to mount not only a tracking camera but also an inertial sensor on the HMD and estimate the position and pose of a real object relative to the HMD (spatial relationship between the real object and the HMD) using the tracking camera and the inertial sensor is considered to be effective (tracking of a real object in accordance with such a scheme is referred to as "inertial and optical fusion tracking").

As in the above-described case, when a tracking camera and an inertial sensor cooperatively function as a "tracker (tracking device)", it is desirable that the correspondence between a coordinate system of the tracking camera and that of the inertial sensor is established (or these two are calibrated with respect to each other). Further, not only when the tracking camera and the inertial sensor are used as the "tracker" but also when the tracking camera and an image display section are calibrated using the eyes (retinas) of a user as a criterion, it is useful that the calibration between the coordinate systems of the tracking camera and the inertial sensor has been established. Further, it is preferable that the calibration method is simple and a calibration result is highly precise.

An advantage of some aspects of the invention is to solve at least a part of the problems described above, and the invention can be implemented as the following forms.

(1) An aspect of the invention provides an image display device. The image display device includes: a first inertial sensor; an imaging section; and a calculation section that calculates a first spatial relationship between the imaging section and a marker based at least on an image of the marker captured by the imaging section, the marker being presented by a device having a second inertial sensor movable relative to the first inertial sensor. The calculation section calculates a second spatial relationship between the imaging section and the first inertial sensor based at least on the first spatial relationship, first data and second data. The first data includes a first orientation of the first inertial sensor and the second data includes a second orientation of the second inertial sensor. The first data and the second data are respectively obtained from the first inertial sensor and the second inertial sensor in the case where the image of the marker is captured by the imaging section.

(2) An image display device according to another aspect of the invention may further include: a first memory area that stores the first data; a second memory area that stores the second data; and a third memory area that stores the first spatial relationship. The calculation section may calculate the second spatial relationship using the first data stored in the first memory area, the second data stored in the second memory area, and the first spatial relationship stored in the third memory area.

(3) An image display device according to another aspect of the invention may further include: a static condition determination section. The imaging section may capture the image of the marker and the calculation section may obtain the first data and the second data respectively from the first inertial sensor and the second inertial sensor in the case where the static condition determination section determines that the first inertial sensor and the second inertial sensor are in a static condition based on outputs from the first inertial sensor and the second inertial sensor. The calculation section may calculate the second spatial relationship based at least on the first data, the second data, and the first spatial relationship obtained by capturing the image of the marker.

(4) An image display device according to another aspect of the invention may further include: a memory section that stores a third spatial relationship between the marker and the second inertial sensor. The calculation section may calculate the second spatial relationship based at least on the first data, the second data, the first spatial relationship, and the third spatial relationship.

(5) An image display device according to another aspect of the invention may further include: a memory section that stores a third spatial relationship between the marker and the second inertial sensor. The calculation section may obtain the first data including the first orientation and a first acceleration measured by the first inertial sensor and the second data including the second orientation and a second acceleration measured by the second inertial sensor in the case where the static condition determination section determines that the first inertial sensor and the second inertial sensor are in the static condition. The calculation section may calculate the second spatial relationship based at least on the first acceleration, the first orientation, the second acceleration, the second orientation, the first spatial relationship, and the third spatial relationship.

(6) In an image display device according to another aspect of the invention, the imaging section may be configured so that pivotal or rotational movement of the imaging section around a predetermined one axis is enabled and pivotal or rotational movement of the imaging section around two other axes perpendicular to the predetermined one axis is prohibited.

(7) According to another aspect of the invention provides a program implementable by a computer in an image display device including a first inertial sensor capable of detecting an acceleration and an imaging section capable of capturing an image of an outside scene. The computer program may cause the computer to realize functions of: calculating a first spatial relationship between the imaging section and a marker based at least on an image captured by the imaging section, the maker being presented by a device having a second inertial sensor movable relative to the first inertial sensor, and calculating a second spatial relationship between the imaging section and the first inertial sensor based at least on the first spatial relationship, first data and second data. The first data includes a first orientation of the first inertial sensor and the second data includes a second orientation of the second inertial sensor. The first data and the second data are respectively obtained from the first and second inertial sensors in the case where the image of the marker is captured by the imaging section.

(8) According to another aspect of the invention provides an image display system that has a head-mounted display device and a display device capable of displaying an image of a marker. The head-mounted display device includes: a first inertial sensor; an imaging section; and a calculation section. The display device includes: a second inertial sensor. The calculation section calculates first spatial relationship between the marker and the imaging section based at least on an image of the maker captured by the imaging section, the marker being displayed by the display device based on data of the marker. The calculation section calculates second spatial relationship between the imaging section and the first inertial sensor based at least on the first spatial relationship, first data and second data. The first data includes a first orientation of the first inertial sensor and the second data includes a second orientation of the second inertial sensor. The first data and the second data are respectively obtained from the first inertial sensor and the second inertial sensor in the case where the image of the marker is captured by the imaging section.

Not all of the plurality of constituent elements included in each of the aspects of the invention described above are essential elements. To resolve some or all of the problems described above or achieve some or all of the advantages described in the present specification, some constituent elements of the plurality of constituent elements can appropriately be changed and deleted and can be replaced with new and different constituent elements, and some of the restricted content can be deleted. To resolve some or all of the problems described above or achieve some or all of the advantages described in the present specification, some or all of the technical features included in one aspect of the invention described above can be combined with some or all of the technical features included in another aspect of the invention described above and can be configured as an independent aspect of the invention.

For example, an aspect of the invention can be implemented as a method in which some or all of the three elements such as the first inertial sensor, the imaging section, and the calculation section are included. That is, the device may include or may not include the first inertial sensor. The device may include or may not include the imaging section. The device may include or may not include the calculation section. For example, the imaging section may be movable relative to the first inertial sensor. The device may be implemented as, for example, an image display device and can also be implemented as a device other than the image display device. According to the aspects of the invention, it is possible to achieve at least one of the various tasks such as an improvement and simplification of the precision of the device and an improvement inconvenience for the user using the method. Some or all of the technical features of each aspect of the method described above can be applied to this method.

The invention may also be implemented in various forms other than the device. For example, the invention can be implemented as an image display device, various control methods of controlling the device, a computer program implementing the control method, a recording medium recording the computer program, and a data signal implemented in a carrier wave including the computer program.

BRIEF DESCRIPTION OF THE DRAWINGS

The invention will be described with reference to the accompanying drawings, wherein like numbers reference like elements.

FIG. 5 is a diagram illustrating each calibration.

DESCRIPTION OF EXEMPLARY EMBODIMENTS

A. Embodiment

Figure 1:
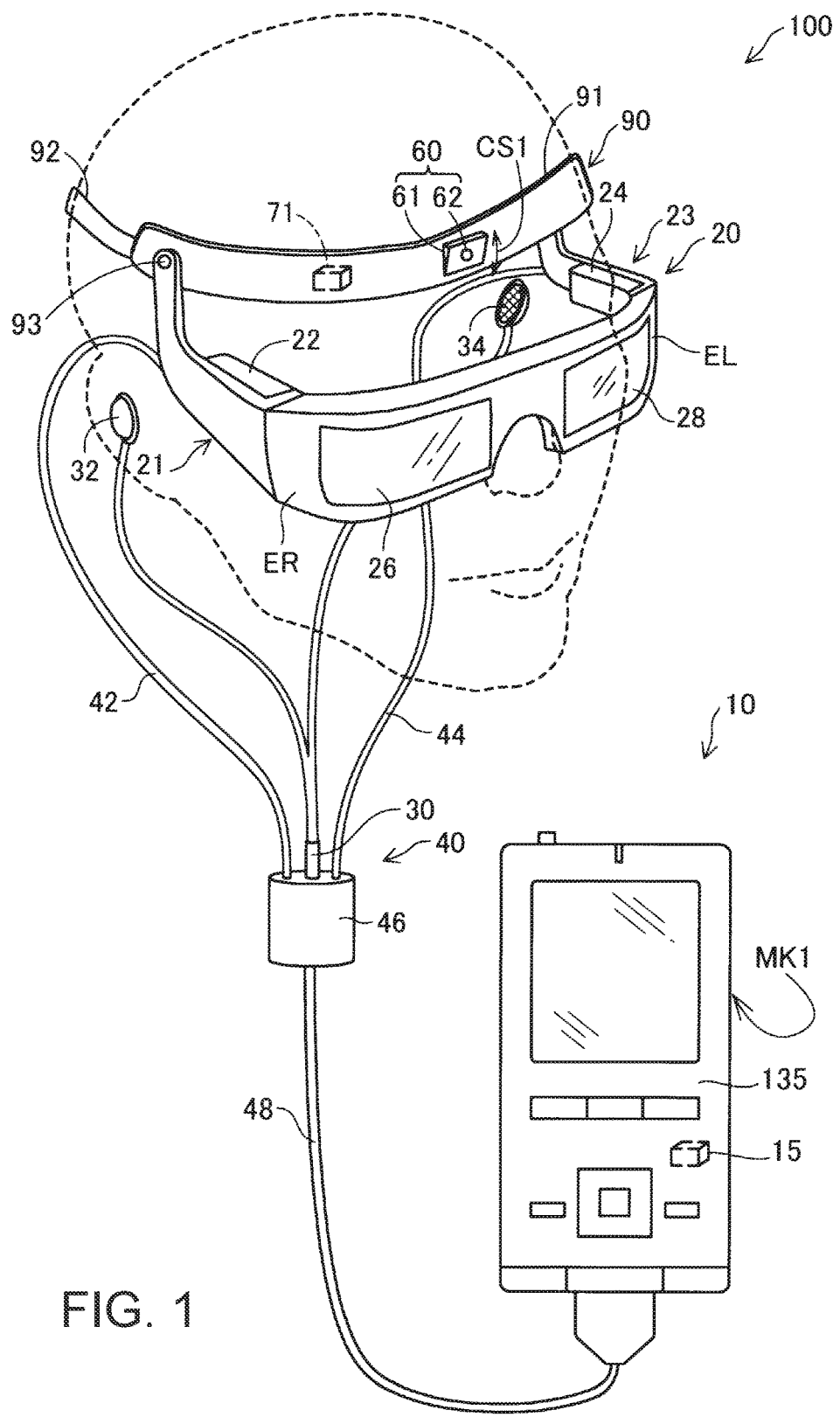
FIG. 1 is a diagram illustrating an overall configuration of a head-mounted display device as an image display device according to a first embodiment of the invention.

In the embodiment, the following items will be described sequentially.
A-1. Configuration of Head-mounted Display Device
A-2. Calibration A-3. Offline Calibration
A-3-1. Calibration Data Collection Process
A-3-2. Optimization Process
A-4. Online Calibration
A-4-1. Calibration Data Processing
A-4-2. Cost Function Optimization Process A-1. Configuration of Head-Mounted Display Device FIG. 1 is a diagram illustrating an overall configuration of a head-mounted display device as an image display device according to a first embodiment of the invention. A head-mounted display device 100 is a display device which is to be mounted on a head and is also referred to as a head-mounted display (HMD). The HMD 100 is an optical transmissive, or optical see-through, head-mounted display with which a user can view a virtual image and can directly view an outside scene simultaneously.

The HMD 100 includes a mounting structure 90 that can be mounted on the head of the user, an image display section 20 that displays an image, and a control section (controller) 10 that controls the image display section 20. In other words, the image display section 20 allows the user to view a virtual image when the image display section 20 is mounted on the head of the user.

The mounting structure 90 includes a mounting base section 91 made of a resin, a belt section 92 made of a fabric connected to the mounting base section 91, a camera 60, and an IMU 71. The mounting base section 91 has a curved shape suitable for the front part of the head of a person. The belt section 92 is a belt that is mounted around the head of the user.

The camera 60 can image an outside scene and is disposed in the middle portion of the mounting base section 91. In other words, when the mounting structure 90 is mounted on the head of the user, the camera 60 is disposed at a position corresponding to the middle of the forehead of the user. Therefore, when the user mounts the mounting structure 90 on his or her head, the camera 60 captures an image of an outside scene which is an outside landscape in the visual line direction of the user and obtains a captured image obtained through the imaging.

The camera 60 includes a camera base section 61 movable relative to the mounting base section 91 and a lens section 62 of which a relative position to the camera base section 61 is fixed. When the mounting structure 90 is mounted on the head of the user, the camera base section 61 is rotationally movable along an arrow CS1 of an axis included in a plane that includes a central axis of the user. Therefore, the optical axis of the lens section 62 which is an optical axis of the camera 60 can be changed in the range of the arrow CS1. The lens section 62 captures an image of a range which can be changed through zoom while the center is fixed on the optical axis.

The inertial measurement unit (IMU) 71 is an inertial sensor that detects acceleration. The IMU 71 according to the embodiment can detect not only acceleration but also an angular velocity and geomagnetism. The IMU 71 is embedded near the camera 60 in the mounting base section 91. Therefore, the IMU 71 detects the geomagnetism in addition to the acceleration and the angular velocities of the mounting structure 90 and the camera base section 61. The IMU 71 corresponds to a first inertial sensor in the summary.

The image display section 20 is a display section which is connected to the mounting base section 91 of the mounting structure 90 and has a glasses shape in the embodiment. The image display section 20 includes a right holding section 21, a right display driving section 22, a left holding section 23, a left display driving section 24, a right optical image display section 26, and a left optical image display section 28. The right optical image display section 26 and the left optical image display section 28 are located in front of the right and left eyes of the user when the user mounts the image display section 20. One end of the right optical image display section 26 and one end of the left optical image display section 28 are mutually connected at a position corresponding to the middle of the forehead of the user when the user mounts the image display section 20.

The right holding section 21 has a shape which extends from an end portion ER which is the other end of the right optical image display section 26 in the substantially horizontal direction and is inclined upward from the midway portion, and joins the end portion ER to a right connection portion 93 of the mounting base section 91. Similarly, the left holding section 23 has a shape which extends from an end portion EL which is the other end of the left optical image display section 28 in the substantially horizontal direction and is inclined upward from the midway portion, and joins the end portion EL to a left connection portion (not illustrated) of the mounting base section 91. When the right holding section 21 and the left holding section 23 are connected to the mounting base section 91 by the right and left connection portions 93, the right optical image display section 26 and the left optical image display section 28 are located in front of the eyes of the user. The connection portions 93 are connected such that the right holding section 21 and the left holding section 23 can be rotated and can be fixed at any rotational position. The detailed mechanisms of the connection portions 93 are known configurations, and thus the detailed description will be omitted. As a result, the image display section 20 is provided to be rotatable relative to the mounting base section 91.

The right holding section 21 is a member that is provided to extend from the end portion ER which is the other end of the right optical image display section 26 to a position corresponding to a temporal region of the user when the user mounts the image display section 20. Similarly, the left holding section 23 is a member that is provided to extend from the end portion EL which is the other end of the left optical image display section 28 to a position corresponding to a temporal region of the user when the user mounts the image display section 20. The right display driving section 22 and the left display driving section 24 are disposed on sides facing the head of the user when the user mounts the image display section 20.

The display driving sections 22 and 24 include liquid crystal displays 241 and 242 (hereinafter also referred to as "LCDs 241 and 242") and projection optical systems 251 and 252, as will be described below in FIG. 2. The detailed description of the configurations of the display driving sections 22 and 24 will be described below. The optical image display sections 26 and 28 include light guiding plates 261 and 262 (see FIG. 2) and a light adjustment plate, as will be described below. The light guiding plates 261 and 262 are formed of a resin material with a light transmission property and guide image light output from the display driving sections 22 and 24 to the eyes of the user. The light adjustment plate is an optical element with a thin plate shape and is disposed to cover the outside of the image display section 20 which is an opposite side to the side of the eyes of the user. By adjusting light transmittance of the light adjustment plate, it is possible to adjust the amount of outside light entering the eyes of the user and adjust view easiness of a virtual image.

The image display section 20 further includes a link section 40 that connects the image display section 20 to the control section 10. The link section 40 includes a body cord 48 connected to the control section 10, a right cord 42, a left cord 44, and a connection section 46. The right cord 42 and the left cord 44 are two cords branched from the body cord 48 at the connection section 46. The image display section 20 and the control section 10 transmit various signals via the link section 40. For example, metal cables or optical cables can be adopted for the right cord 42, the left cord 44, and the body cord 48.

The control section 10 is a section that controls the HMD 100. The control section 10 includes an operation section 135 that includes an electrostatic track pad or a plurality of buttons which can be pressed, an IMU 15, and an identification marker MK1 that is imaged and used for calibration. The identification marker MK1 is disposed on the rear surface that is opposite to the front surface on which the operation section 135 is formed in the control section 10. Therefore, in FIG. 1, the identification marker MK1 is not illustrated. The details of the identification marker MK1 will be described below.

The IMU 15 is the same inertial sensor as the IMU 71 which is embedded in the image display section 20. Therefore, the IMU 15 detects geomagnetism in addition to acceleration and angular velocities of the identification marker MK1 and the control section 10 of the identification marker MK1 and the control section 10. The IMU 15 corresponds to a second inertial sensor in the summary.

Figure 2:
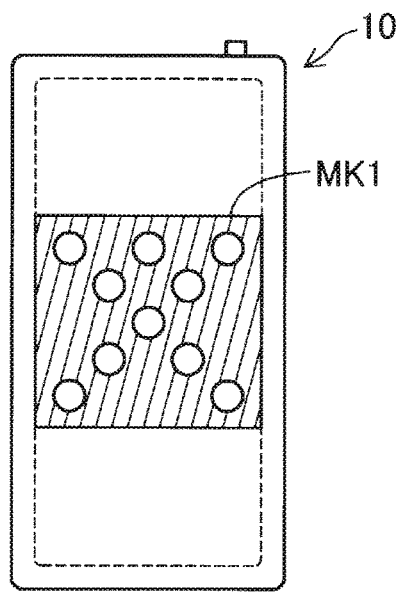
FIG. 2 is a schematic diagram illustrating an identification marker disposed on the rear surface of a control section.
Figure 3:
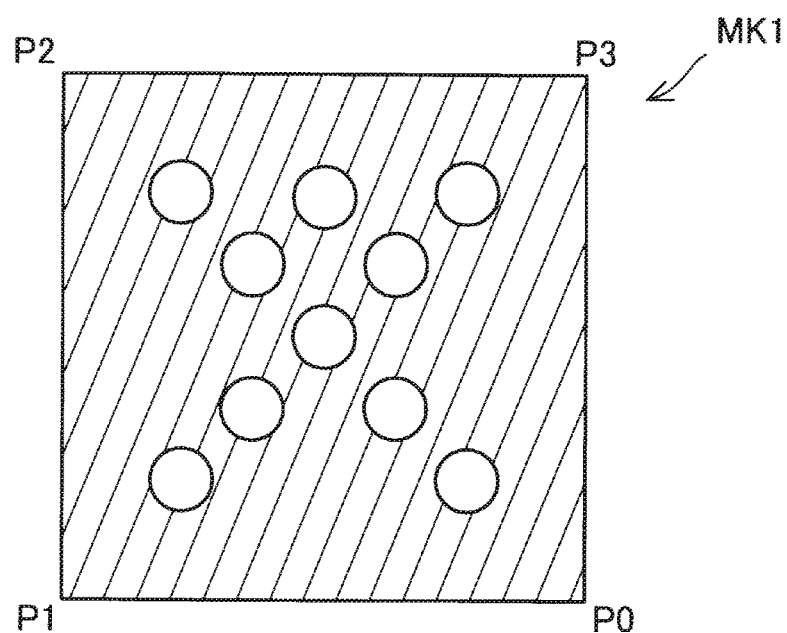
FIG. 3 is a diagram illustrating the details of the identification marker.

FIG. 2 is a schematic diagram illustrating the identification marker MK1 disposed on the rear surface of the control section 10. FIG. 3 is a diagram illustrating the details of the identification marker MK1. As illustrated in FIG. 2, the identification marker MK1 in which 10 circles are formed in a square is disposed on the rear surface of the control section 10. As illustrated in FIG. 3, the identification marker MK1 is a 2-dimensional marker in which 10 circles are formed in a square in which 4 vertexes P0, P1, P2, and P3 are joined with straight lines. As shown in FIGS. 2 and 3, in the marker MK1, among a black portion indicated with hatching white circles without hatching are formed. In a conversion parameter calculation process to be described below, coordinate values of the centers of the white circles are used so that the degree of overlap between the identification marker MK1 imaged by the camera 60 and a marker image IMG prepared in advance to match the identification marker MK1 to be described below is determined. The identification marker MK1 corresponds to a marker MK1 in the summary and the control section 10 in which the identification marker MK1 is disposed corresponds to "a to-be-identified section" or "a device" in the summary.

Figure 4:
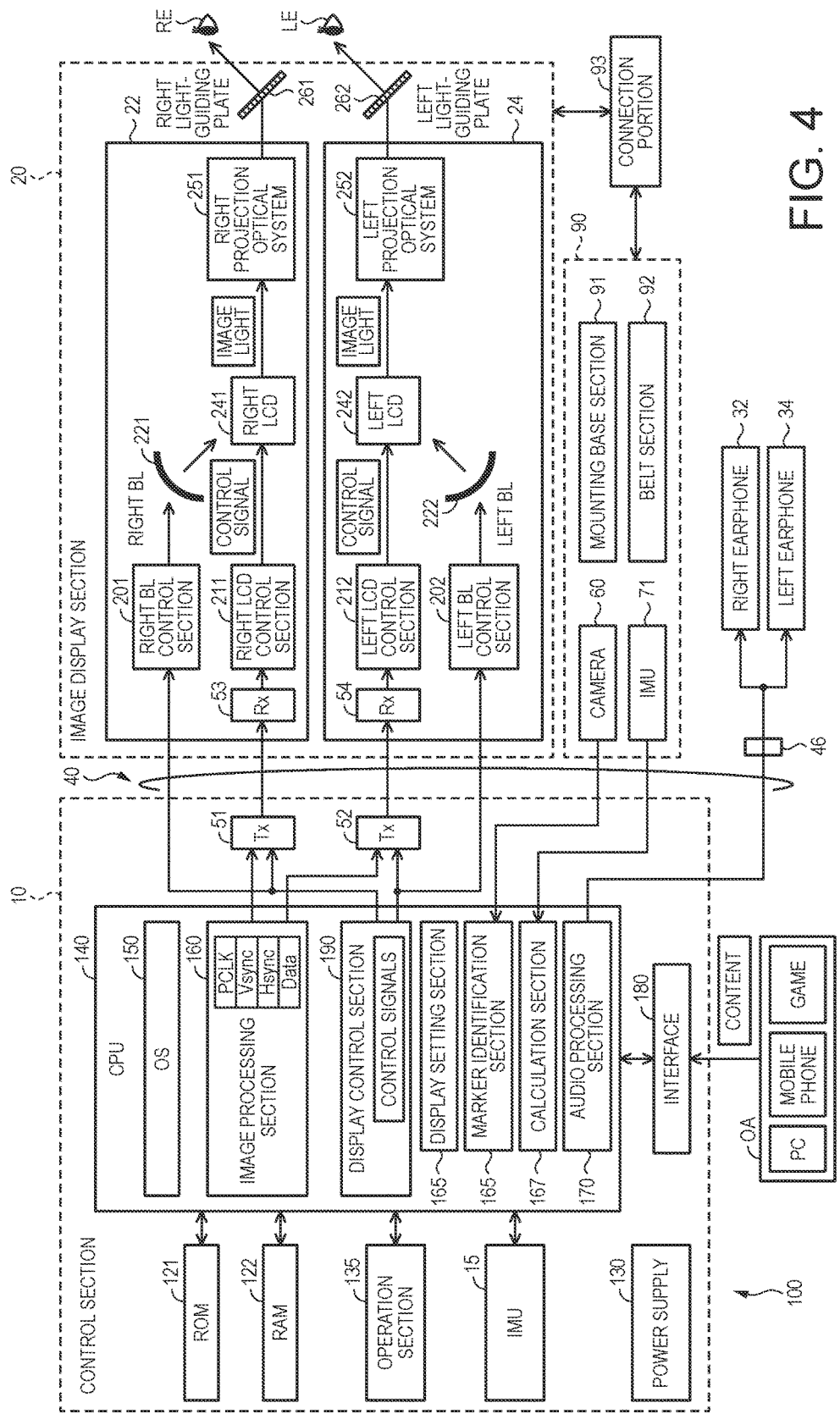
FIG. 4 is a block diagram functionally illustrating the configuration of an HMD.

FIG. 4 is a block diagram functionally illustrating the configuration of the HMD 100. As illustrated in FIG. 4, the control section 10 includes a ROM 121, a RAM 122, a power supply 130, an operation section 135, an identification target memory section 139, a CPU 140, an interface 180, a transmission section 51 (Tx 51), a transmission section 52 (Tx 52), and the IMU 15.

The power supply 130 supplies power to each section of the HMD 100. The ROM 121 stores various computer programs. The CPU 140 to be described below loads the various computer programs stored in the ROM 121 on the RAM 122 to execute the various computer programs.

The CPU 140 loads computer programs stored in the ROM 121 on the RAM 122 to function as an operation system 150 (OS 150), a display control section 190, an audio processing section 170, an image processing section 160, a marker identification section 165, and a calculation section 167. The RAM 122 corresponds to a first memory area, a second memory area, and a third memory area in the summary. In the embodiment, the first memory area, the second memory area, and the third memory area correspond to the RAM 122, but the three memory areas may be stored in another memory in another embodiment.

The display control section 190 generates control signals to control the right display driving section 22 and the left display driving section 24. The display control section 190 controls generation and emission of image light by each of the right display driving section 22 and the left display driving section 24. The display control section 190 transmits control signals for a right LCD control section 211 and a left LCD control section 212 via the transmission sections 51 and 52. The display control section 190 transmits control signals for a right backlight control section 201 and a left backlight control section 202.

The image processing section 160 obtains image signals included in content and transmits the obtained image signals to reception sections 53 and 54 of the image display section 20 via the transmission sections 51 and 52. The audio processing section 170 obtains audio signals included in content, amplifies the obtained audio signals, and supplies the audio signals to a speaker (not illustrated) in the right earphone 32 and a speaker (not illustrated) in the left earphone 34 connected to the connection section 46.

The marker identification section 165 binarizes captured images obtained by the camera 60 using a predetermined gray scale value as a threshold value. The marker identification section 165 extracts the same marker MK1 as the marker image IMG stored in the ROM 121 among the binarized images. In the embodiment, the marker identification section 165 first binarizes the captured images using an initial threshold value set in advance. The marker identification section 165 extracts an image subjected to the same determination as feature points of the marker image IMG among the captured images with respect to the binarized images. The feature points of the marker image IMG are the vertexes P0, P1, P2, and P3 which are 4 vertexes of the square and 9 white circles included in the square. For example, the marker identification section 165 extracts the identification marker MK1 subjected to the same determination as the marker image IMG among the captured images by determining whether points are arranged as the feature points of the 9 circles on the diagonal lines joining two facing vertexes with the same positional relationship as the marker image IMG. For example, the marker identification section 165 determines whether the binarized 5 white circles are arranged with respect to the black color on a straight line joining the vertexes P0 and P2 and/or a straight line joining the vertexes P1 and P3 in FIG. 3, or this determination is made using the sizes of the arranged white circles, the sizes of the black areas interposed between the plurality of circles, or the like.

When the identification marker MK1 is not be extracted through the binarization using the initial threshold value, the marker identification section 165 binarizes the captured images using a new threshold value obtained by adding an addition threshold value which is a gray scale set in advance to the initial threshold value and extracts the identification marker MK1. In this way, the marker identification section 165 performs the binarization using several gray scale values as threshold values to extract the identification marker MK1 among the captured images. When the identification marker MK1 is not be extracted from an imaging range even using the plurality of threshold values, the marker identification section 165 determines that the identification marker MK1 is not included in the imaging range.

When the identification marker MK1 is extracted by the marker identification section 165, the calculation section 167 calculates spatial relationship (relative positional relationship expressed with at least one of rotation and translation) relative to the camera 60 by, for example, homography. As will be described below, the calculation section 167 calculates a conversion, or transformation, matrix to perform conversion from a coordinate system fixed to the camera to a coordinate system (first sensor coordinate system) fixed to the IMU 71 using the calculated spatial relationship, a detected value of acceleration or the like detected by the IMU 71, and a detected value of acceleration or the like detected by the IMU 15.

The interface 180 is an interface that connects the control section 10 to various external devices OA which are content supply sources. Examples of the external devices OA include a storage device storing an AR scenario, a personal computer (PC), a mobile phone terminal, and a game terminal. As the interface 180, for example, a USB interface, a micro USB interface, or an interface for a memory card can be used.

As illustrated in FIG. 4, the image display section 20 includes a right display driving section 22, a left display driving section 24, a right light-guiding plate 261 serving as the right optical image display section 26, and a left light-guiding plate 262 serving as the left optical image display section 28.

The right display driving section 22 includes a reception section 53 (Rx 53), a right backlight control section 201 (right BL control section 201) and a right backlight 221 (right BL 221) functioning as a light source, a right LCD control section 211 and a right LCD 241 functioning as a display element, and a right projection optical system 251. The right backlight control section 201 and the right backlight 221 function as a light source. The right LCD control section 211 and the right LCD 241 function as a display element.

The reception section 53 functions as a receiver that performs serial transmission between the control section 10 and the image display section 20. The right backlight control section 201 drives the right backlight 221 based on an input control signal. The right backlight 221 is, for example, a luminous body such as an LED or an electroluminescence (EL). The right LCD control section 211 drives the right LCD 241 based on control signals transmitted from the image processing section 160 and the display control section 190. The right LCD 241 is a transmissive liquid crystal panel in which a plurality of pixels are arrayed in a matrix form.

The right projection optical system 251 is configured by a collimating lens that forms image light emitted from the right LCD 241 as a light flux in a parallel state. The right light-guiding plate 261 serving as the right optical image display section 26 guides the image light output from the right projection optical system 251 to a right eye RE of the user while reflecting the image light along a predetermined optical path. The left display driving section 24 has the same configuration as the right display driving section 22 to correspond to a left eye LE of the user, and thus the description thereof is omitted.

A-2. Calibration

In calibration (also referred to as IMU-camera calibration) using the IMU 71, the IMU 15, and the camera 60, precision may differ depending on the performance of the IMU which is an inertial sensor. When an inexpensive IMU of which the precision is not high is used, a large error or drift may occur in the calibration.

In the embodiment, the calibration is performed in accordance with a batch solution base algorithm which uses a multi-position method using two IMUs, the IMU 71 and the IMU 15. The multi-position method has the following (1) to (4) advantages when the calibration is performed.

(1) Since the detection of the IMU 71 and the IMU 15 and the imaging of the camera 60 are performed at a static position, there is no problem in synchronization of time.

(2) By using captured images and detected values at a plurality of positions, it is possible to reduce noise of the IMU (each sensor included in the IMU) and the camera 60 by filtering.

(3) As illustrated in FIG. 5, since outputs of a gyro sensor, an acceleration sensor, and a magnetic sensor in the IMU are fused and the orientation of the IMU is obtained, drift of each sensor is corrected and the orientation of the IMU is highly precise.

(4) By using the identification marker MK1 disposed in the control section 10, a device executing complicated calibration or another device other than the HMD 100 is not necessary.

In the embodiment, design data or data in specifications at the time of manufacturing is used for translation between the IMU 71 and the camera 60.

FIG. 5 is a diagram illustrating an execution entity performing each process of a calibration execution process. Here, such processes may be executed continuously. In the calibration execution process, calibration of an independent sensor is first executed (step S10). In the process of step S10, separate calibration is executed for the IMU 71, the IMU 15, and the camera 60. In the calibration method for the independent sensor, a technology which is generally well known may be used and the description thereof is omitted.

In step S10, the IMU 71 and the IMU 15 are each calibrated. Specifically, in a tri-axial acceleration sensor ($Ax$, $Ay$, $Az$), a tri-axial gyro sensor ($Gx$, $Gy$, $Gz$), and a tri-axial geomagnetic sensor ($Mx$, $My$, $Mz$) included in the IMU 71, calibration is performed on gain/scale, static bias/offset, and skew among three axes. When such calibration is executed, each of the IMU 71 and the IMU 15 outputs acceleration ($Acc_{cali}(t)$), an angular velocity ($Gyro_{cali}(t)$), and a geomagnetism ($Mag_{cali}(t)$) as output values of acceleration, an angular velocity, and geomagnetism. The output values are values obtained after correcting gains, static bias/offset, and misalignment among the three axes. The calibration is executed in a manufacturing factory in many cases when the HMD 100 is manufactured, as illustrated in FIG. 5.

In the calibration of the camera 60 executed in step S10, internal parameters of the camera 60 including a focal distance, a skew, a principal point position, and distortion in the camera 60 are calibrated. In the calibration of the camera 60, a known technology can be applied.

After the calibration of the sensors of the IMU 71 and the IMU 15 is executed, the sensor orientation of high precision in the sensors can be obtained by fusing detected values (measured outputs) of the sensors for acceleration, angular velocities, and geomagnetism in the IMU 71 and the IMU 15.

Figure 6:
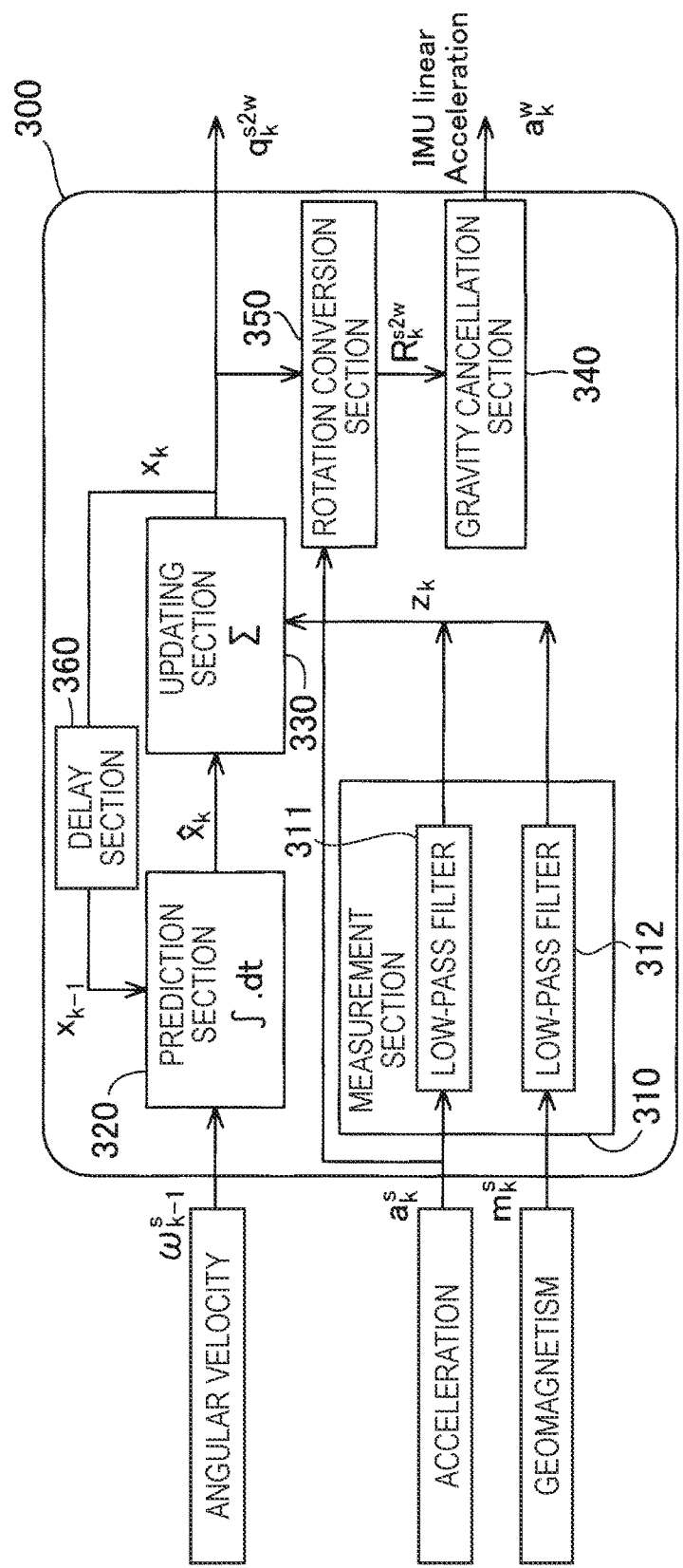
FIG. 6 is a block diagram illustrating a fusion section that performs fusion of detected values based on an extended Kalman filter (EFK) in an IMU.

FIG. 6 illustrates a fusion section 300 in each of the IMU 71 and the IMU 15. The fusion section 300 may also be located outside the IMU 71 and the IMU 15. The fusion section 300 fuses measurements (values or signals) of the internal sensors based on an extended Kalman filter (EKF).

In the embodiment, the sensor orientation (pose) is notated by quaternion. The orientation notation by quaternion can be converted into a rotation matrix. The extended Kalman filter is applied to a condition vector expressed as follows.

$$X = [q_{s2w}, b_{gyro}] \quad (1)$$

A control input vector is defined by an input of a gyro sensor.

$$u = [\omega^s] \quad (2)$$

A state transition model from K−1 to K during a time interval Δt is expressed as follows.

$$x_k = f(x_{k-1}, u_{k-1}, w_{k-1}) \quad (3)$$

Here, $w_{k-1}$ is a process noise vector.

As illustrated in FIG. 6, the fusion section 300 includes a measurement section 310, a prediction section 320, an updating section 330, a gravity cancellation section 340, and a rotation conversion section 350. The measurement section 310 functions based on measurements $a^s_k$ and $m^s_k$ of acceleration and geomagnetism output from the acceleration sensor and the geomagnetic sensor. The measurement section 310 includes low-pass filters 311 and 312. The low-pass filter 311 reduces noise in the measurements $a_s^k$ of the acceleration. Similarly, the low-pass filter 312 reduces noise in the geomagnetic measurements $m^s_k$.

The prediction section 320 predicts the amount of angle change (or pose) by integrating a detected angular velocity $\omega^s_{k-1}$ during a predetermined time period and outputs the predicted angle change (or pose) to the updating section 330. The updating section 330 filters, or fuses, the measurements $z_k$ (the acceleration and the geomagnetism) using the predicted angle change (or pose). Then, a fused IMU orientation (pose) $q^{s2w}_k$ is updated, output, and fed back to the measurement section 320 via a delay section 360 for a subsequent cycle. When the fused IMU orientation (pose) $q^{s2w}_k$ is calculated, dynamic or linear acceleration $a^w_k$ of the IMU is calculated by gravity cancellation with the gravity cancellation section 340.

The rotation conversion section 350 receives the IMU orientation (pose) $q^{s2w}_k$, converts the IMU orientation (pose) $q^{s2w}_k$ into a rotation matrix $R^{s2w}_k$, and outputs the rotation matrix $R^{s2w}_k$. The measurements $a^s_k$ of the acceleration from the acceleration sensor is input to the gravity cancellation section 340. The gravity cancellation section 340 cancels the Earth gravity acceleration using the IMU orientation expressed with the rotation matrix $R^{s2w}_k$, calculates IMU linear acceleration $a^w_k$ containing no element of the Earth gravity acceleration, and outputs the linear acceleration $a^w_k$ of the IMU.

Adjustment for fusion of detected values based on the extended Kalman filter described above with reference to FIG. 6 may be performed in many cases in a factory where the HMD 100 is manufactured.

When the process of step S10 in FIG. 5 is performed, the CPU 140 executes offline calibration and verification in the IMU 71 (step S20). Since the camera 60 is not fixed to the mounting base section 91 but is rotatable, calibration according to a changed position of the camera 60 is necessary in the process of step S20. In the present specification, this point will be described in detail.

A-3. Offline Calibration

Next, the CPU 140 executes offline calibration of the HMD (step S20). In the offline calibration, a rotation matrix ($R_{marker2conImu}$) from a coordinate system fixed to the identification marker MK1 to a coordinate system fixed to the IMU 15 and a rotation matrix ($R_{cam2hmdImu}$) from a coordinate system fixed to the camera 60 to a coordinate system fixed to the IMU 71 are derived. That is, in the offline calibration, spatial relationship between the identification marker MK1 and the IMU 15 and spatial relationship between the camera 60 and the IMU 71 are derived.

Figure 7:
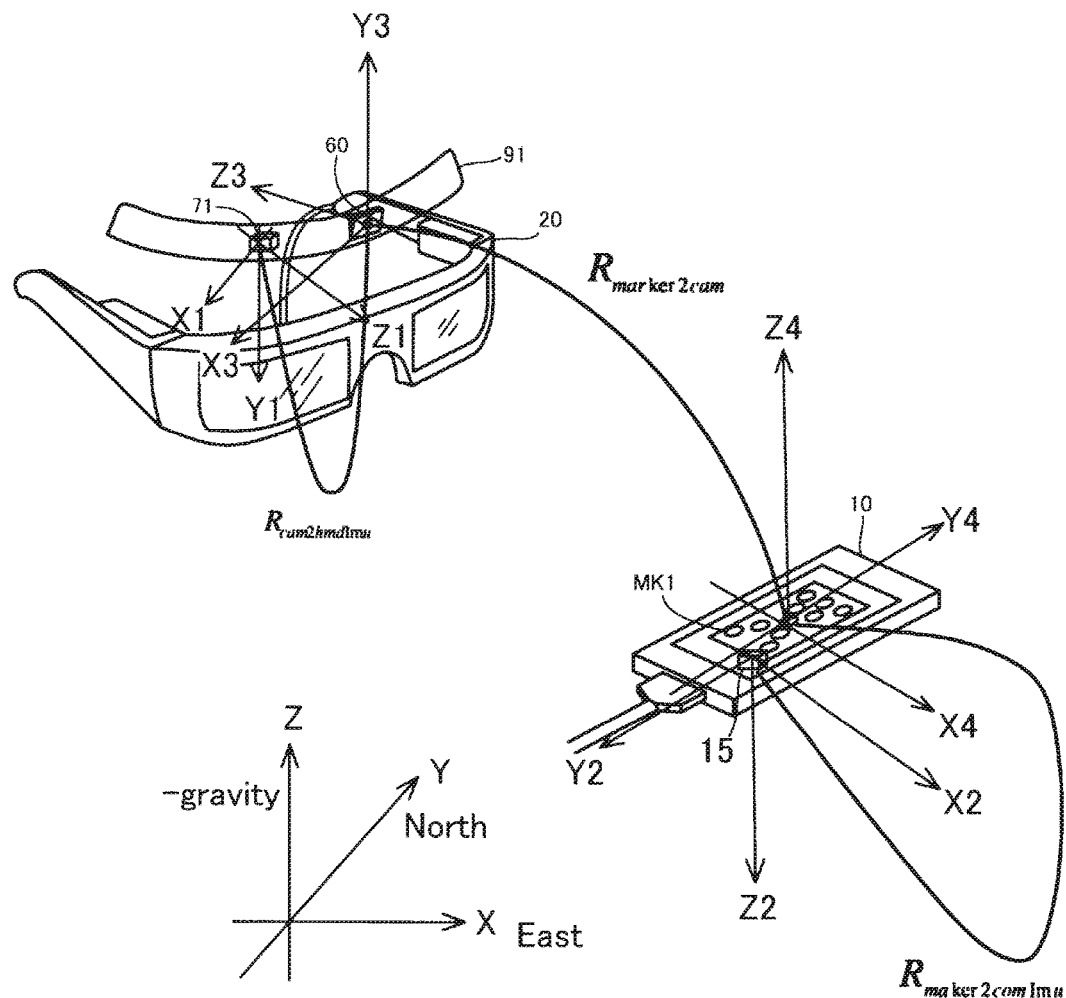
FIG. 7 is a schematic diagram illustrating a positional relationship between a camera and the identification marker when the identification marker is imaged.

FIG. 7 is a schematic diagram illustrating a positional relationship between the camera 60 and the identification marker MK1 when the identification marker MK1 is imaged. In FIG. 7, the image display section 20, the mounting base section 91 which is a part of the mounting structure 90, the camera 60, the IMU 71 embedded and fixed to the mounting base section 91, and the control section 10 are illustrated. In FIG. 7, the identification marker MK1 and the IMU 15 fixed inside the control section 10 are illustrated. In FIG. 7, the absolute coordinate system that is expressed by three axes of X (East), Y (North), and Z (gravity) and four coordinate systems different from the absolute coordinate system are also illustrated. Hereinafter, the absolute coordinate system is also referred to as the world coordinate system.

One of the four coordinate systems different from the absolute coordinate system is a first coordinate system that is expressed by three axes of X1, Y1, and Z1 fixed to the IMU 71. Another thereof is a second coordinate system that is expressed by X2, Y2, and Z2 fixed to the IMU 15. Still another thereof is a camera coordinate system that is expressed by X3, Y3, and Z3 fixed to the camera 60. The remaining one thereof is a marker coordinate system that is expressed by X4, Y4, and Z4 fixed to the identification marker MK1. In FIG. 7, the rotation matrix $R_{cam2hmdImu}$ from the camera coordinate system to the first coordinate system, a rotation matrix $R_{marker2cam}$ from the marker coordinate system to the camera coordinate system, and the rotation matrix $R_{marker2conImu}$ from the marker coordinate system to the second coordinate system are also illustrated.

Here, an output of orientation (in this case, ground orientation to be described below) from the IMU 71 can be defined as a rotation matrix $R_{hmdimu2world}$ from the first coordinate system to the world coordinate system. Similarly, an output of orientation from the IMU 15 can be defined as a rotation matrix $R_{conImu2world}$ from the second coordinate system to the world coordinate system. When a rotation matrix $R_{marker2world}$ from the marker coordinate system to the world coordinate system is defined as a rotation matrix other than the rotation matrixes illustrated in FIG. 7, a relationship of Expression (4) below is established.

$$R_{marker2world} = R_{conImu2world} R_{marker2conImu}$$

$$R_{marker2world} = R_{hmdimu2world} R_{cam2hmdImu} R_{marker2cam} \quad (4)$$

In the embodiment, the rotation matrix $R_{cam2hmdImu}$ indicating the spatial relationship between the camera 60 and the IMU 71 and the rotation matrix $R_{marker2conImu}$ indicating the spatial relationship between the identification marker MK1 and the IMU 15 are calculated through the offline calibration. The offline calibration may involve nonlinear optimization in which high precision is repeatedly achieved. This point is the same for online calibration to be described below. As initially assumed values for the nonlinear optimization, values of low precision for instance values at the time of design or a value of a device specification, may be used. For example, a value indicated in Expression (5) below may be used as an initially assumed value.

$$R_{cam2hmdimu} = \begin{bmatrix} 1 & 0 & 0 \\ 0 & -1 & 0 \\ 0 & 0 & -1 \end{bmatrix} \text{ and } R_{marker2conimu} = \begin{bmatrix} 1 & 0 & 0 \\ 0 & -1 & 0 \\ 0 & 0 & -1 \end{bmatrix} \quad (5)$$

From Expression (4), the calculation section 167 can calculate the left side of Expression (6) below indicating a predicted value of the orientation of the IMU 71 based on the rotation matrix $R_{conImu2world}$ indicating the orientation of the IMU 15 output by the IMU 15 and the rotation matrix $R_{marker2conImu}$ indicating the spatial relationship between the identification marker MK1 and the IMU 15. In this embodiment, the "orientation of the IMU" is indicated by an output of the IMU. When the IMU is in a static condition, the orientation of the IMU indicates the pose of the IMU relative to the direction of the gravity acceleration and the geomagnetism of the Earth and is a pose in the above-described absolute coordinate system. In the present specification, when the IMU is in a static condition, the orientation of the IMU is also referred to as "ground orientation" of the IMU. Hereinafter, "inv" in the following expressions means a matrix inverse.

$$\hat{R}_{hmdimu2world} = R_{conImu2world} R_{marker2conImu} \text{inv}(R_{cam2hmdImu} R_{marker2cam}) \quad (6)$$

From Expression (4), similarly, the calculation section 167 can calculate the left side of Expression (7) below indicating a predicted value of the ground orientation of the IMU 15 based on a rotation matrix $R_{hmdimu2world}$ indicating the orientation of the IMU 71 output by the IMU 71, the rotation matrix $R_{cam2hmdImu}$ indicating the spatial relationship between the camera 60 and the IMU 71, and the rotation matrix $R_{marker2cam}$ indicating the spatial relationship between the identification marker MK1 and the camera 60, and the rotation matrix $R_{marker2conImu}$ indicating the spatial relationship between the identification marker MK1 and the IMU 15.

$$\hat{R}_{conImu2world} = R_{hmdimu2world} R_{cam2hmdImu} R_{marker2cam} \text{inv}(R_{marker2conImu}) \quad (7)$$

The calculation section 167 can calculate the rotation matrix $R_{marker2cam}$ in Expression (7) using a detection algorithm and homography of the identification marker MK1 of high precision.

The calculation section 167 can calculate a predicted value of a higher precision by reducing sensor noise or marker jittering. For example, as indicated in Expression (8), the marker jittering is reduced by averaging a plurality of frames obtained by imaging the identification marker MK1 at a static position.

$$R_{marker2cam} = \frac{1}{N} \sum_{t=1}^{N} R_{marker2cam}(t) \quad (8)$$

Similarly, for sensor orientation of the IMU, sensor noise and an error of a measured value can be reduced by averaging a plurality of frames at a static position, as indicated in Expressions (9) and (10).

$$R_{hmdimu2world} = \frac{1}{M} \sum_{t=1}^{M} R_{hmdimu2world}(t) \quad (9)$$

$$R_{conImu2world} = \frac{1}{M} \sum_{t=1}^{M} R_{conImu2world}(t) \quad (10)$$

Similarly, acceleration, angular velocities, and geomagnetism detected (or measured) by the acceleration sensor, the gyro sensor, and the magnetic sensor of the IMU 71 and the IMU 15 are calculated as values with small noise for which drift is reduced by averaging the plurality of frames at the static positions and by correcting and compensating bias estimated by the fusion section 300, as indicated in Expressions (11) to (13).

$$Acc_{obs} = \frac{1}{M} \sum_{t=1}^{M} (Acc_{cali}(t) - b_{acc}(t)) \quad (11)$$

$$Gyro_{obs} = \frac{1}{M} \sum_{t=1}^{M} (Gyro_{cali}(t) - b_{gyro}(t)) \quad (12)$$

$$Mag_{obs} = \frac{1}{M} \sum_{t=1}^{M} (Mag_{cali}(t) - b_{mag}(t)) \quad (13)$$

Here, $b_{acc}(t)$, $b_{gyro}(t)$, and $b_{mag}(t)$ which are biases are dynamic sensor drifts estimated by the fusion section 300.

When the IMU is a static condition, the acceleration detected by the IMU is only gravity acceleration. Geomagnetism $h=[h_x, 0, h_z]$ detected by the IMU 71 or the IMU 15 is measured by estimating the position of the head of the user mounting the image display section 20 and the mounting structure 90. In the embodiment, the gravity acceleration and the geomagnetism conform to a north, east, and down coordinate system (NED coordinate system) which is commonly used. When a gravity vector is g=[0, 0, g] (where g=9.81 m/s$^2$), a magnetic inclination angle is to be calibrated or measured. For example, with inclination angle of 55 degrees and the geomagnetism is measured to be $h_x=0.26$, Gauss, $h_z=0.37$ Gauss in this embodiment.

In a specific environment in which there is a different magnetic field from the NED coordinate system, a vector selection technology may be used. In the vector selection technology, the sensed magnetic field strength $h_{horm}$ and a dip angle $\delta_{dip}$ are compared to $\lambda_h$ and $\lambda_{dip}$ which are nominal values of a magnetic field in which a predetermined threshold values are used. In a comparison result, measurement of magnetism exceeding the predetermined threshold value is neglected in calibration. In the vector selection technology, error measurement expressions are expressed as in Expressions (14) and (15) below in the IMU 71 from Expression (9), (11), and (13).

$$E_{acc}(\text{hmdimu}) = \|Acc_{obs}(\text{hmdimu}) - \hat{R}_{world2hmdimu} g\|^2 \quad (14)$$

$$E_{mag}(\text{hmdimu}) = \|Mag_{obs}(\text{hmdimu}) - \hat{R}_{world2hmdimu} h\|^2 \quad (15)$$

The right side of Expression (14) is a square of a distance of a difference vector between an acceleration vector $ACC_{obs}$ (hmdimu) measured by the acceleration sensor in the IMU 71 and a vector obtained by multiplying the rotation matrix indicating the orientation of the IMU 71 expressed in the IMU coordinate system predicted based on Expression (6) by a vector g of the gravity acceleration. The right side of Expression (15) is a square of a distance of a difference vector between a magnetic vector $M_{agobs}$ (hmdimu) measured by the magnetic sensor in the IMU 71 and a vector obtained by multiplying the rotation matrix indicating the orientation of the IMU 71 expressed in the IMU coordinate system predicted based on Expression (6) by a geomagnetic vector h.

Expressions (16) and (17) below are indicated in the IMU 15 from Expressions (10), (11), and (13).

$$E_{acc}(\text{conImu}) = \|Acc_{obs}(\text{conImu}) - \hat{R}_{world2hmdimu} g\|^2 \quad (16)$$

$$E_{mag}(\text{conImu}) = \|Mag_{obs}(\text{conImu}) - \hat{R}_{world2hmdimu} h\|^2 \quad (17)$$

The right side of Expression (16) is a square of a distance of a difference vector between an acceleration vector $ACC_{obs}$ (conImu) measured by the acceleration sensor in the IMU 15 and a vector obtained by multiplying the rotation matrix indicating the orientation of the IMU 15 expressed in the IMU coordinate system predicted based on Expression (7) by the vector g of the gravity acceleration. The right side of Expression (17) is a square of a distance of a difference vector between a magnetic vector $Mag_{obs}$ (conImu) measured by the magnetic sensor in the IMU 15 and a vector obtained by multiplying the rotation matrix indicating the orientation of the IMU 15 expressed in the IMU coordinate system predicted based on Expression (7) by the geomagnetic vector h. Therefore, a cost function desired to be minimized to reduce the error is expressed as in Expression (18) below.

$$E=\eta_0 E_{acc}(\text{hmdimu})+\eta_1 E_{mag}(\text{hmdimu})+\eta_2 E_{acc}(\text{conImu})+\eta_3 E_{mag}(\text{conImu}) \quad (18)$$

Here, $\eta_0$, $\eta_1$, $\eta_2$, and $\eta_3$ are weighting coefficients for adjusting a difference in each term. The coefficients are set according to noise variances of the sensors, as indicated in Expression (19).

$$\eta_0 = \frac{1}{\sigma_{acc}^2(hmdimu)},$$

$$\eta_1 = \frac{1}{\sigma_{mag}^2(hmdimu)},$$

$$\eta_2 = \frac{1}{\sigma_{acc}^2(con/mu)},$$

and $$\eta_3 = \frac{1}{\sigma_{mag}^2(con/mu)}. \quad (19)$$

When the IMU does not detect the geomagnetism, the cost function may be considered only for acceleration of three axes and is expressed as in Expression (20).

$$E=\eta_0 E_{acc}(\text{hmdimu})+\eta_2 E_{acc}(\text{conImu}) \quad (20)$$

In the embodiment, since the camera 60 can be rotated relative to the mounting base section 91 in which the IMU 71 is embedded, the coordinate system fixed to the camera 60 is consequently movable relative to the coordinate system fixed to the IMU 71. In the embodiment, when the camera 60 is set in each of both ends of the movable range, the calculation section 167 collects data at a plurality of different static positions. The collected data are (1) $ACC_{obs}$ (hmdimu) and $Mag_{obs}$ (hmdimu) which are the outputs of the acceleration sensor and the magnetic sensor included in the IMU 71, (2) orientation $R_{imuhmd2world}$ of the IMU 71 output by the fusion section 300, (3) $ACC_{obs}$ (conImu) and $Mag_{obs}$ (conImu) which are the outputs of the acceleration sensor and the magnetic sensor included in the IMU 15, (4) orientation $R_{imuCon2world}$ of the IMU 15 output by the fusion section 300, and (5) the rotation matrix $R_{marker2cam}$ indicating the spatial relationship between the identification marker MK1 and the camera 60. The above data is also notated as calibration data. In the online calibration to be described below, the calibration data of (1) to (5) above is also collected. Then, the calculation section 167 calculates the spatial relationship between the identification marker MK1 and the IMU 15 and the spatial relationship between the camera 60 and the IMU 71 by minimizing the left side of Expression (18) or (20) described above based on the collected data. A specific method of minimizing Expression (18) or (20) will be described below in A-3-2. The calculated spatial relationship between the identification marker MK1 and the IMU 15 is used as fixed values in the online calibration to be described below.

Figure 8:
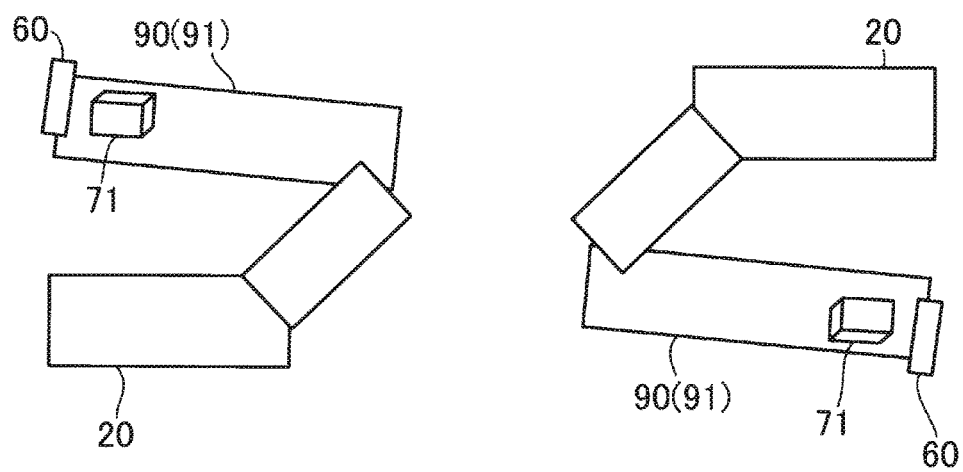
FIG. 8 is a schematic diagram illustrating an image display section and a mounting structure located at two different static positions.
Figure 9:
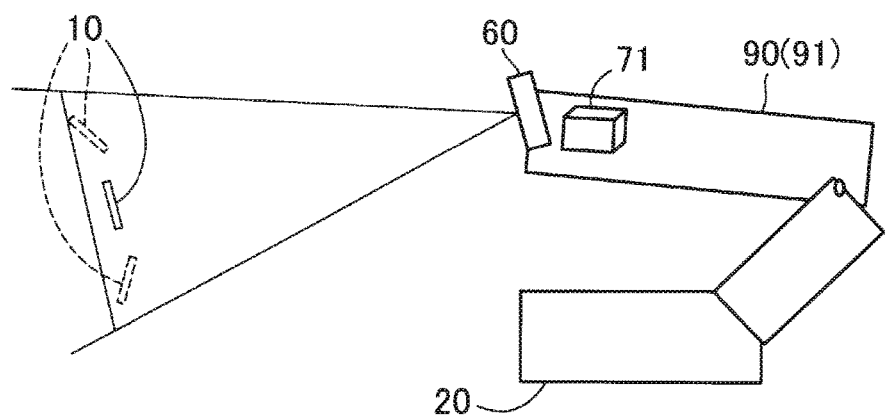
FIG. 9 is a diagram illustrating a relationship with the identification marker imaged by the camera located at a static position.
Figure 10:
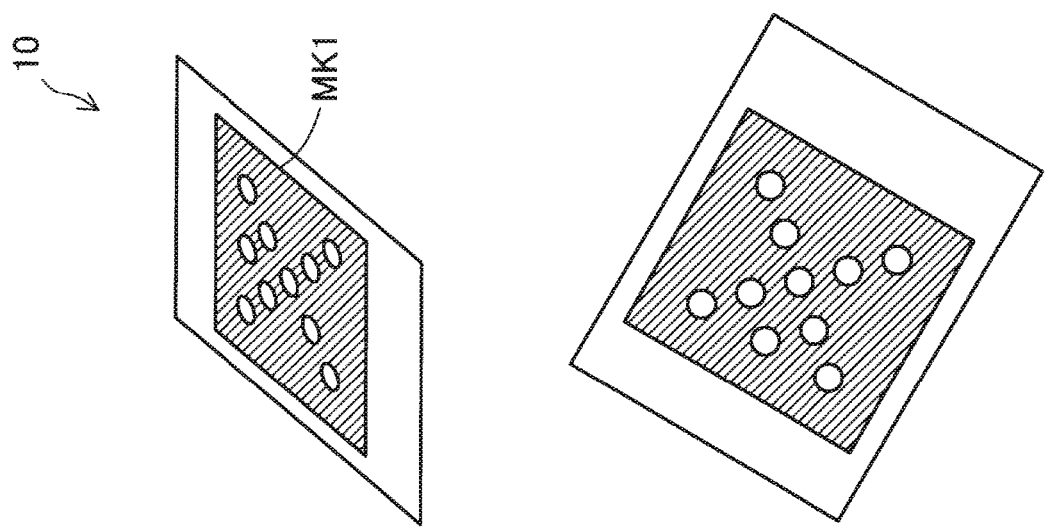
FIG. 10 is a schematic diagram illustrating images when the identification marker of which the pose is different is imaged by the camera.
Figure 10:
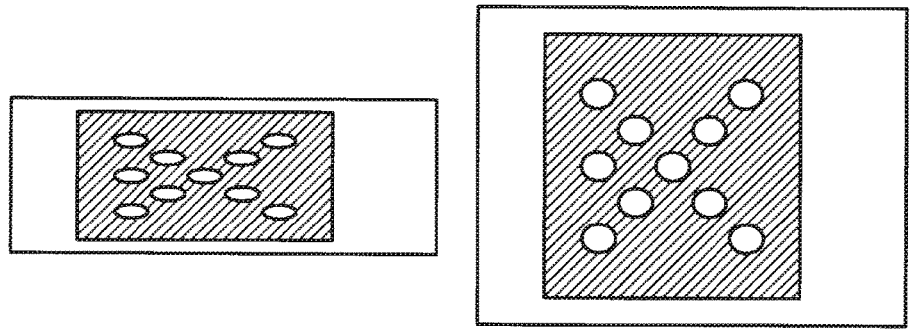
Figure 10:
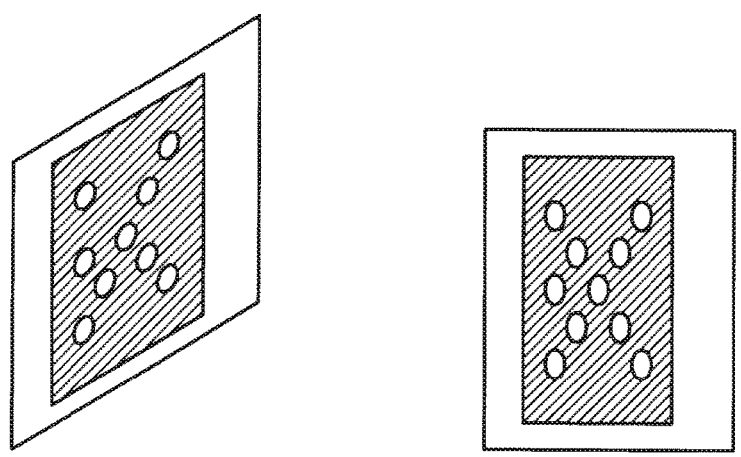

FIG. 8 is a schematic diagram illustrating the image display section 20 and the mounting structure 90 located at two different static positions. FIG. 9 is a diagram illustrating a relationship with the identification marker MK1 imaged by the camera 60 located at a static position. FIG. 10 is a schematic diagram illustrating images when the identification marker MK1 of which the pose is different is imaged by the camera 60. FIG. 9 illustrates the control section 10 present at different positions of three patterns in an imaging range in which the camera 60 can perform imaging. In FIG. 9, the three control sections 10 are not imaged at once. To show that the three control sections 10 are not imaged at once, the two control sections 10 are illustrated with dotted lines. In FIG. 10, it is indicated that captured images of the identification marker MK1 are different according to the direction in which or the position at which the identification marker MK1 disposed on the rear surface of the control section 10 is imaged. In FIG. 10, six captured images of the identification marker MK1 are illustrated as examples. However, the captured images of the identification marker MK1 are not limited to the images illustrated in FIG. 10.

A-3-1. Calibration Data Collection Process

Figure 11:
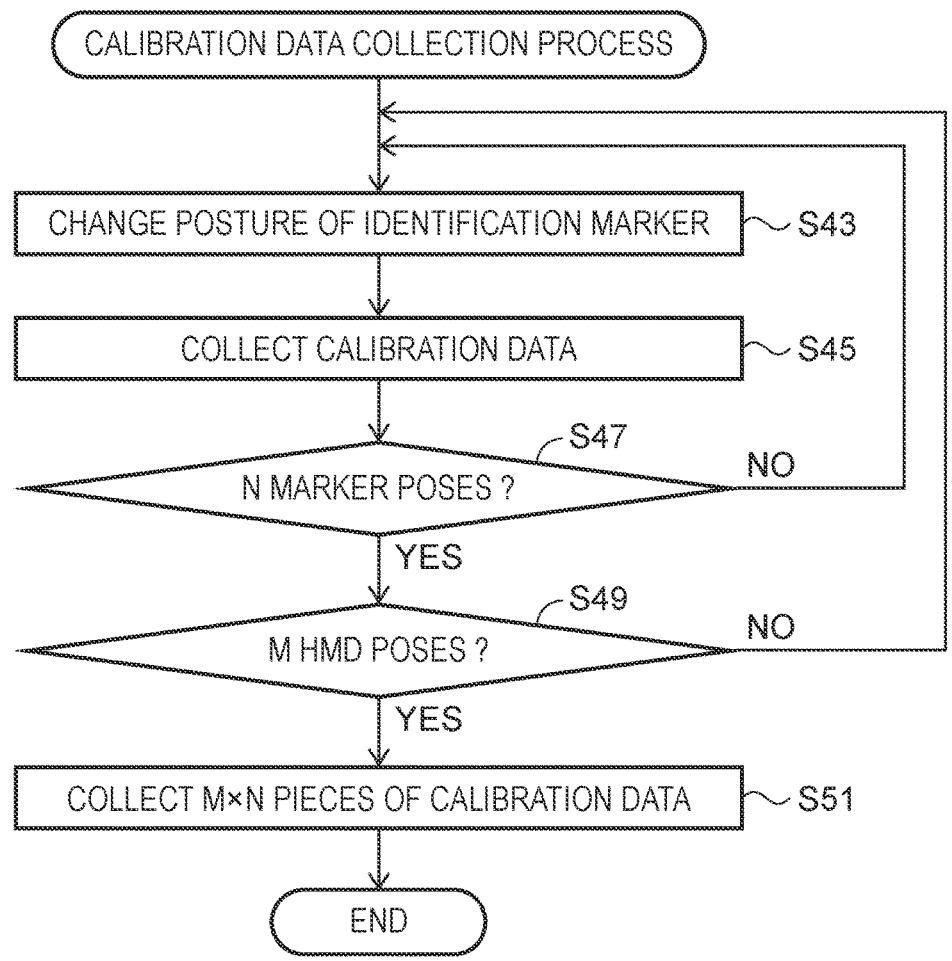
FIG. 11 is a flowchart illustrating a marker imaging process of imaging the identification marker at different static positions to execute online calibration.

FIG. 11 is a flowchart illustrating a process of collecting data from the IMU 15 and the IMU 71 and also imaging the identification marker MK1 at different static positions to execute offline calibration in the embodiment. Specifically, the above-described pieces of calibration data (1) to (5) are collected through this process. In a marker imaging process, the position or direction of the identification marker MK1 (hereinafter also referred to as the pose of the IMU 15) is first changed within the imaging range of the camera 60 (step S43). The calculation section 167 collects the calibration data at each of the different poses in the condition that the static position of the camera 60 is fixed (step S45). The calculation section 167 determines whether N sets of calibration data for which the pose of the identification marker MK1 relative to the HMD is different are collected (step S47). When the calculation section 167 determines that only the sets of calibration data less than N are obtained (NO in step S47), the user is prompted so that the pose of the identification marker MK1 is changed N or more times and the process transitions to step S43. As a method of prompting the user to take any procedures or actions in this process and also in subsequent processes, there are methods for outputting audio by the earphones 32 and 34 and displaying text images by the optical image display sections 26 and 28.

When the calculation section 167 determines in the process of step S47 that the pose of the identification marker MK1 is changed N or more times and the calibration data is collected (YES in step S47), the calculation section 167 determines whether the static position of the HMD (hereinafter also referred to as a pose of the IMU 71) is changed M times and the calibration data is collected (step S49). When the calculation section 167 determines that the number of poses of the HMD is less than M (NO in step S49), the user is prompted to perform the processes subsequent to step S43 again. When the calculation section 167 determines in the process of step S49 that the number of poses of the image display section 20 having already obtained the calibration data is M or more (YES in step S49), the calculation section 167 collects the data of the number obtained by multiplying M which is the number of poses of the image display section 20 by N which is the number of poses of the identification marker MK1 as data for executing the calibration (step S51) and the marker imaging process ends.

A-3-2. Optimization Process

In the embodiment, an optimization process of reducing a calibration error is performed by defining a nonlinear cost function and minimizing the defined cost function. To minimize the cost function, the Gauss-Newton method is used. When the Gauss-Newton method is used, the calibration error can be minimized by minimizing a sum of squares of errors for all collected calibration data. A cost function E using the Gauss-Newton method is expressed as in Expression (21) below.

$$E = \sum_{1}^{M} e^2(r) \quad (21)$$

In the embodiment, $e^2(r)$ can be expressed as in Expression (18). A minimum value is derived by repeating changing r gradually with respect to a set initial predicted value, as in Expression (22).

$$r^n = r^{n-1} + \Delta r \quad (22)$$

An increment $\Delta r$ in Expression (22) is a solution of a normal equation and e in Expression (21) is expressed with the Yacobian matrix in Expression (23).

$$e = -J_r \Delta r \quad (23)$$

To minimize a sum of squares in the Gauss-Newton method, Expression (24) may be solved.

$$\min \|e + J_r \Delta r\| \quad (24)$$

The increment $\Delta r$ is derived by Expression (25) below.

$$\Delta r = -(J_r^T J_r)^{-1} J_r^T \quad (25)$$

Here, the rotation matrix is generally expressed with the Euler angles as in Expressions (26) and (27) below.

$$R = Rz(\gamma) * Ry(\beta) * Rx(\gamma) \quad (26)$$

$$Rx = \begin{bmatrix} 1 & 0 & 0 \\ 0 & \cos\alpha & -\sin\alpha \\ 0 & \sin\alpha & \cos\alpha \end{bmatrix}, \quad (27)$$

$$Ry = \begin{bmatrix} \cos\beta & 0 & \sin\beta \\ 0 & 1 & 0 \\ -\sin\beta & 0 & \cos\beta \end{bmatrix}$$

and $$Rz = \begin{bmatrix} \cos\gamma & -\sin\gamma & 0 \\ \sin\gamma & \cos\gamma & 0 \\ 0 & 0 & 1 \end{bmatrix}$$

In the above-described offline calibration, the rotation matrix $R_{cam2hmdImu}$ indicating the spatial relationship between the camera 60 and the IMU 71 and the rotation matrix $R_{marker2conImu}$ indicating the spatial relationship between the identification marker MK1 and the IMU 15 can be expressed as in Expressions (28) and (29).

$$R_{cam2hmdImu} = Rz(\gamma_{cam2hmdImu}) Ry(\beta_{cam2hmdImu}) Rx(\alpha_{cam2hmImu}) \quad (28)$$

$$R_{marker2conImu} = Rz(\gamma_{marker2conImu}) Ry(\beta_{marker2conImu}) Rx(\alpha_{marker2conImu}) \quad (29)$$

In the embodiment, r expressed in the foregoing expression is expressed as in Expressions (30) and (31).

$$r = [\alpha_{cam2hmImu}, \beta_{cam2hmImu}, \gamma_{cam2hmdImu}, \quad (30)$$
$$\alpha_{marker2conImu}, \beta_{marker2conImu}, \gamma_{marker2conImu}]$$

$$J(r) = \left[\frac{\partial E}{\partial r}\right] = \left[\frac{\partial E}{\partial \alpha_{cam2hmImu}} \frac{\partial E}{\partial \beta_{cam2hmImu}} \frac{\partial E}{\partial \gamma_{cam2hmdImu}} \right. \quad (31)$$
$$\left. \frac{\partial E}{\partial \alpha_{marker2conImu}} \frac{\partial E}{\partial \beta_{marker2conImu}} \frac{\partial E}{\partial \gamma_{marker2conImu}}\right]$$

Figure 12:
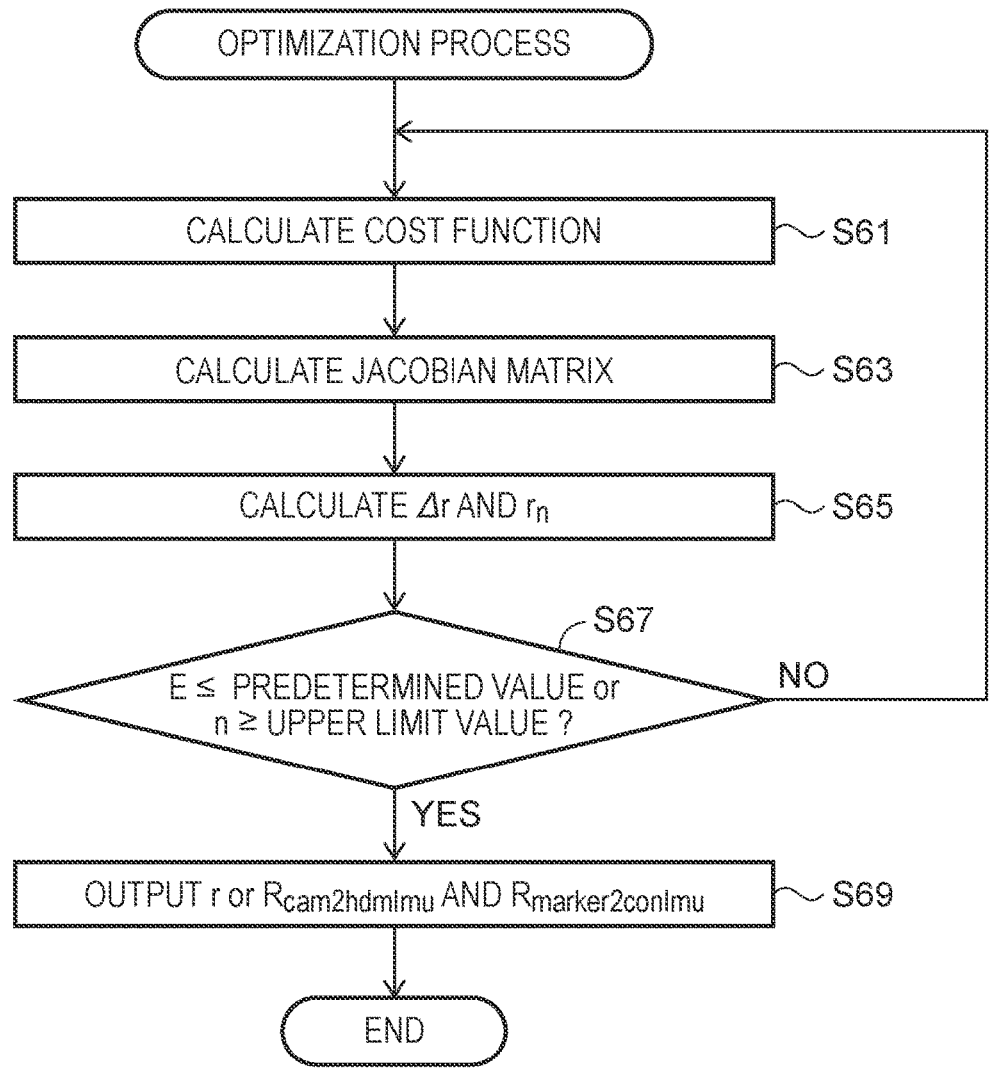
FIG. 12 is a flowchart illustrating an optimization process using a cost function.

FIG. 12 is a flowchart illustrating an optimization process using the cost function E. In the optimization process, first, the calculation section 167 collects the calibration data in the calibration data collection process (FIG. 11) and calculates the cost function E using the stored calibration data (step S61). The calculation section 167 performs calculation using the Jacobian matrix in the calculation of the cost function E (step S63). The calculation section 167 calculates $\Delta r$ by solving the Jacobian matrix and calculates $r_n$ (step S65). The calculation section 167 determines whether (A) the cost function E for which the calculated $r_n$ is used is equal to or less than a predetermined value set in advance or (B) the iteration number n is equal to or greater than an upper limit value set in advance (step S67). When the calculation section 167 determines that none of the conditions (A) and (B) is satisfied (NO in step S67), the processes subsequent to step S61 and its subsequent steps are repeated. When the calculation section 167 determines that at least one of the conditions (A) and (B) is satisfied (YES in step S67), r from which an error such as noise is reduced or the rotation matrix $R_{cam2hmdImu}$ and the rotation matrix $R_{marker2conImu}$ are output (step S69) and the optimization process ends. To perform the optimization process using the cost function E is also referred to as refining. As illustrated in FIG. 5, for example, the offline calibration may be performed in a factory or by the user of the HMD 100.

A-4. Online Calibration

As in the offline calibration, the online calibration is also based on Expressions (1) to (31) above. In the embodiment, the lens section 62 of the camera 60 can be rotated along the arrow CS1 (FIG. 1) relative to the camera base section 61. That is, the lens section 62 is rotated relative to the camera base section 61 around one axis as a central axis and the orientation is not changed around the two other orthogonal axes, that is, the lens section 62 is not rotated around the two axes. Therefore, in the online calibration execution process according to the embodiment, the camera base section 61 can be modeled to have one degree of freedom of rotation around the axis. To interpolate a camera rotation between two end points where the camera base section 61 is rotated most vertically in either direction, Expression (32) is derived using a spherical linear supplement (SLERP).

$$SLERP(p, q, t) = \frac{p\sin((1-t)\theta) + q\sin(t\theta)}{\sin\theta} \quad (32)$$

In Expression (32), p and q are quaternions and indicate two endpoints of the rotation. $\theta$ indicates an angle between the two endpoints. The parameter t has a numeral value equal to or greater than 0 and equal to or less than 1. When the angle between the two end points is close to 0 degrees, linear interpolation expressed in Expression (33) is used to avoid division of Expression (32) by the denominator of 0.

$$\text{Linear}(p,q,t)=p(1-t)+qt \quad (33)$$

Consequently, in the online calibration according to the embodiment, the spatial relationship of the camera 60 relative to the IMU 71 is derived by estimating the parameter t of Expression (32) or (33). In the derivation, the spatial relationship between the identification marker MK1 and the IMU 15 may be fixed to the spatial relationship derived by the offline calibration.

To improve precision of the online calibration, there exist preferably considerable differences among a plurality of static positions of the camera 60 at which the calibration data is collected by a motion of the head of the user mounting the image display section 20 and the mounting structure 90. In a procedure in which the user obtains the calibration data of the identification marker MK1, the user preferably performs actions of shaking the head (moving the head laterally) or nodding the head (moving the head vertically) when the identification marker MK1 is present in the visual field of the user and the user preferably stops the head for 2 or 3 seconds at an end point of the action. While the user stops the action, the calibration data can be suitably collected throughout a plurality of times. However, the user may not necessarily move his or her head. The spatial relationship of the camera 60 relative to the IMU 71 can be derived even when the calibration data collected at one static relative position is used.

In an actual imaging situation, it is difficult for the user to accurately stop at an end point of the nodding action or the like. Specifically, even when the user recognizes that the user stops, a hand or the head slightly trembles and the tremble is a cause of the calibration error. A stop condition including even tremble (also referred to as jittering) is also referred to as a static condition in the present specification. Since the jittering of the user in the static condition is dominated not by translation but by a motion caused by rotation, a detected value in the static condition is detected by a gyro sensor detecting an angular velocity. In the embodiment, a static condition determination section in the CPU 140 defines a probability. Based on the probability, it is determined whether the static condition is established or not, namely, whether an angular velocity detected by a gyro sensor represents jittering in the static condition or rotation of the head intended by the user. The probability is defined based on not only the magnitude of the detected value but also a motion history of the head of the user which is a history of detected values accompanied over time. Specifically, the static condition determination section first stores the detected value of the gyro sensor included in the IMU 71 in a memory section. Then, a variance of the motion history during a predetermined period is obtained based on recorded values stored in the memory section. Here, the static condition determination section determines that the detected angular velocity is stable and represents jittering when the variance of the motion history during the predetermined period is small. The probability of the static condition is expressed as in Expression (34) below.

$$\text{prob}_{static}(t) = e^{-\frac{v(t)}{2\sigma_v^2}} e^{-\frac{m(t)^2}{2\sigma_m^2}} e^{-\frac{\omega(t)^2}{2\sigma_\omega^2}} \quad (34)$$

Expression (34) is a probability of the static condition at time t, v(t) is a variance of angular velocities at a short fixed time period, m(t) is an average value of the angular velocities at the fixed time period, and ω(t) is an angular velocity from which drift after fusion of the IMU sensor is excluded and is expressed as in Expression (35).

$$\omega(t)=\text{Gyro}_{cali}(t)-b_{gyro}(t) \quad (35)$$

In Expression (54), $\sigma_v$, $\sigma_m$, $\sigma_\omega$ are parameters indicating a pseudo stop condition.

The static condition of the head of the user is short as in 2 or 3 seconds in many cases. Therefore, the variance of the angular velocities and the average value of the angular velocities are calculated during a short time period T (for example, 1 second). The average value of the angular velocities can be expressed as in Expression (36) and the variance of the angular velocities can be expressed as in Expression (37).

$$m(t) = \sum_{i=t-T}^{t} \omega(t)/T \quad (36)$$

$$v(t) = \sum_{i=t-T}^{t-1} (\omega(t)-m(t))^2/T \quad (37)$$

In the embodiment, when no angular velocity of the head of the user is detected and the probability expressed in Expression (34) is equal to or greater than a threshold value (for example, 80% or more) set in advance, the static condition determination section in the CPU 140 determines that the head of the user stops. That is, the static condition determination section performs the determination based on the variance of the angular velocities during the predetermined time period, the average value of the angular velocities, and the angular velocities during that period of time. When the calculation section 167 determines that the head of the user stops, the calibration data is automatically collected. During the execution of the online calibration according to the embodiment, the identification marker MK1 is detected at 30 frame per second (fps) and the IMU 71 embedded in the mounting base section 91 performs the process at a higher rate (for example, 100 MHz) than the detection of the identification marker MK1. In the embodiment, to execute the calibration based on imaged data at different positions as much as possible, a large angle difference (for example, 20 degrees or more) between two different static positions is preferably requested. An angle difference θ is expressed as in Expression (38) below.

$$\theta = \quad (38)$$
$$a\cos\left(\frac{\text{trace}(R_{hmdimu2world}(\text{current})R_{hmdimu2world}^T(\text{previous})-1)}{2}\right) > Th$$

A-4-1. Calibration Data Processing

Figure 13:
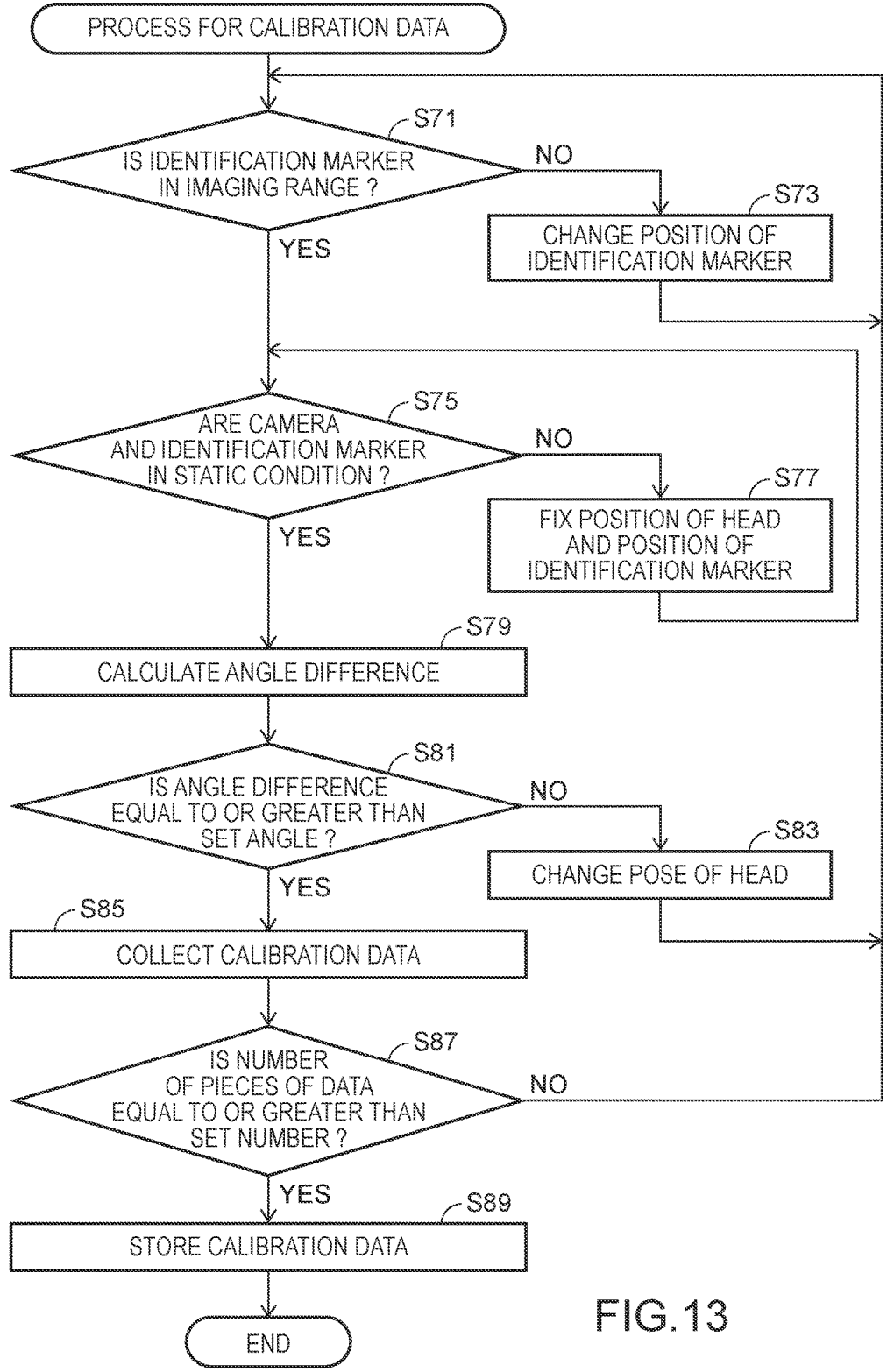
FIG. 13 is a diagram illustrating the flow of a imaged data acquisition process to which static condition determination is added.

FIG. 13 is a diagram illustrating the flow of an imaged data acquisition process to which static condition determination is added. In FIG. 13, a process for the imaged data of the HMD 100 including the camera 60 rotated around one axis is illustrated in addition to the process of determining the probability of the static condition of the head of the user described above. In the imaged data acquisition process, the marker identification section 165 first determines whether the identification marker MK1 is included in the imaging range of the camera 60 (step S71). The marker identification section 165 extracts the identification marker MK1 from the imaging range using the image data corresponding to the identification marker MK1 stored in the ROM 121. When the marker identification section 165 determines that the identification marker MK1 is not included in the imaging range (NO in step S71), the user is prompted to change the position of the identification marker MK1 so that the identification marker MK1 is included in the imaging range (step S73).

When it is determined in the process of step S71 that the identification marker MK1 is included in the imaging range (YES in step S71), the calculation section 167 determines whether the camera 60 and the identification marker MK1 are in the static condition using the detected value of the angular velocity or the like detected by the IMU 71 and the detected value of the angular velocity or the like detected by the IMU 15 (step S75). That is, the calculation section 167 determines whether the user mounting the image display section 20 and the mounting structure 90 and the identification marker MK1 included in the visual field of the user are in a substantially fixed condition. When the calculation section 167 determines that the camera 60 and the identification marker MK1 are not in the static condition (NO in step S75), the user is prompted to fix his or her head and the position of the control section 10 on which the identification marker MK1 is disposed (step S77).

When the calculation section 167 determines in the process of step S75 that the camera 60 and the identification marker MK1 are in the static condition using Expression (34) or the like described above (YES in step S75), the calculation section 167 calculates an angle difference between the positions or orientations in the static condition using Expression (38) (step S79). The calculation section 167 determines whether the calculated angle difference is equal to or greater than an angle (for example, 20 degrees) set in advance (step S81). When the calculation section 167 determines that the calculated angle difference is less than the set angle (NO in step S81), the user is prompted to move his or her head to obtain the imaged data in which the angle difference satisfies the set angle (step S83) and the processes subsequent to step S41 are performed.

When the calculation section 167 determines in the process of step S81 that the calculated angle difference is equal to or greater than the set angle (YES in step S81), the calculation section 167 collects the calibration data from the imaging of the IMU 15, the IMU 71, and the camera 60 (step S85). Specifically, the calculation section 167 detects data (the acceleration and geomagnetism measured by the IMUs at the orientation) of the IMU 15 and the IMU 71 in the static condition, the absolute orientations of the IMUs, and the pose of the identification marker MK1 relative to the camera 60, using the fact that the calculated angle difference is determined to be equal to or greater than the set angle as a trigger. A movable range of the camera 60 according to the embodiment is set to be 20 degrees to 25 degrees.

Next, the calculation section 167 determines whether the number of sets of calibration data which have been collected is equal to or greater than a number set in advance (step S87). When the calculation section 167 determines that the number of sets of calibration data is equal to or greater than the number set in advance (NO in step S87), the processes subsequent to step S71 are repeated to further collect the data.

When the calculation section 167 determines in the process of step S87 that the number of sets of calibration data which have been collected is equal to or greater than the number set in advance (YES in step S87), the collected calibration data is stored (step S89) and the calibration data collection process ends.

A-4-2. Cost Function Optimization Process

In the embodiment, the calibration may be executed by either cost function between a rough cost function of retrieving (searching for) the parameter t in Expression (32) at intervals of 0.25 from 0 to 1 (t=0, t=0.25, t=0.5, t=0.75, and t=1) and a high precision cost function of searching for the parameter t at intervals of 0.1 from 0 to 1 (t=0, t=0.1, t=0.2, . . . , and t=1). In the rough cost function, a parameter t* corresponding to the parameter t after the optimization is expressed in Expression (39) below.

$$R_{cam2hmdImu} = \text{quantion2Rot}(\text{SLERP}(p,q,t^*)) \quad (39)$$

where the "quantion2Rot" in Expression (39) is a function that converts Expression (32) to a rotation matrix expressed with Euler angles.

Figure 14:
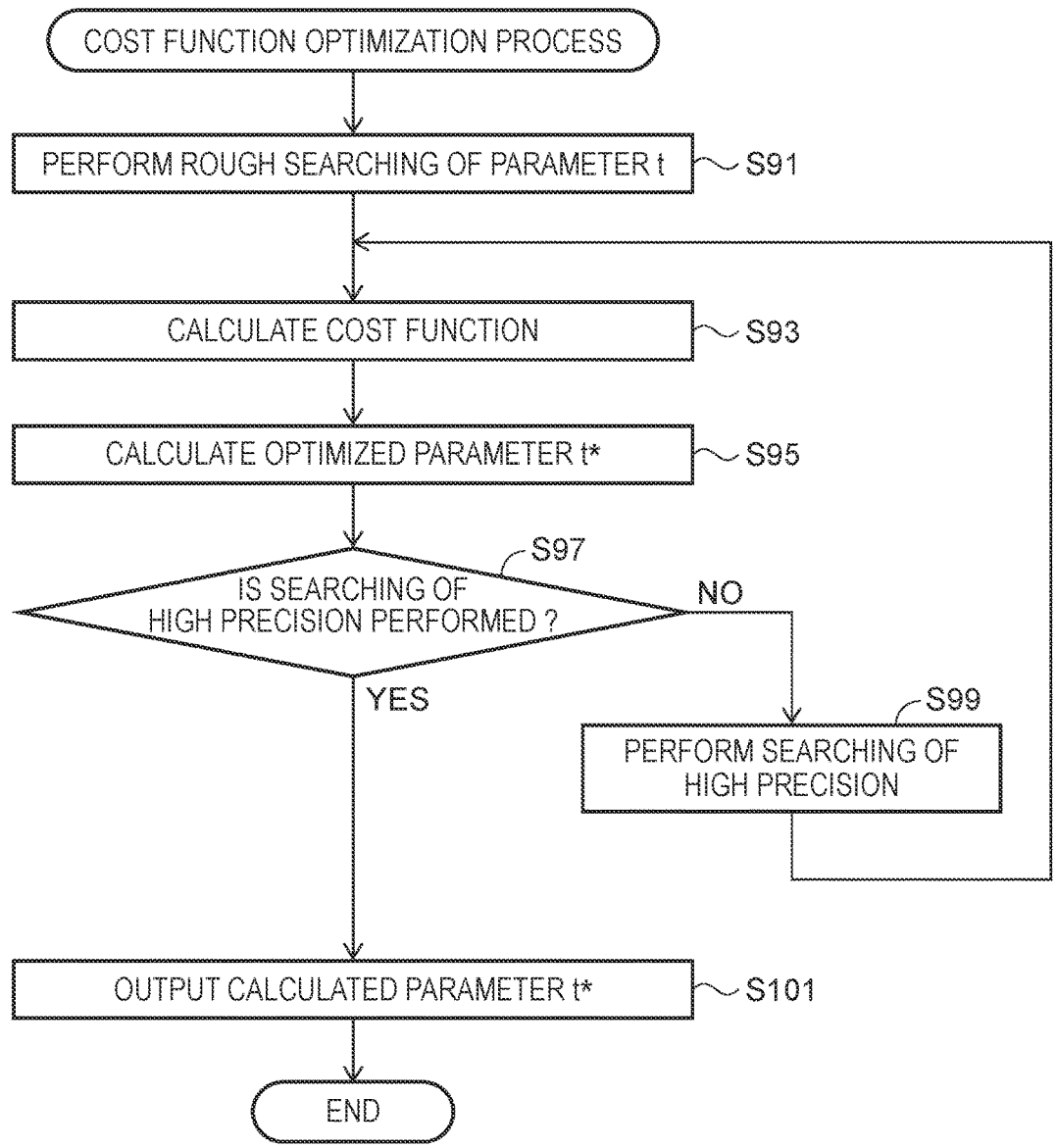
FIG. 14 is a flowchart illustrating a cost function optimization process of optimizing the cost function.

FIG. 14 is a flowchart illustrating a cost function optimization process of optimizing the cost function. In the cost function optimization process illustrated in FIG. 14, the parameter t* shown in Expression (39) is calculated by optimizing t by calculating the rough cost function by the calculation section 167. In the cost function optimization process, the calculation section 167 first searches for the parameter t at intervals of 0.25 from 0 to 1 (step S91). Next, the calculation section 167 calculates the cost function (Expressions (18) and (21)) using a resultant of t and the calibration data collected through the calibration data collection process (FIG. 13) (step S93). The calculation section 167 find the parameter t* which is the most optimized t among the rough sets of t based on the results of calculating the cost function (step S95). Next, the calculation section 167 determines whether the calculated parameter t* is further optimized through the searching of the high precision (step S97). The calculation section 167 determines whether the searching of the high precision is performed on the parameter t at intervals of 0.1 in response to an instruction set in advance. When the calculation section 167 determines that the high precision searching is performed (YES in step S97), the calculation section 167 performs the searching of the high precision on a value close to the calculated parameter t* (step S99) at finer intervals and the processes of step S93 and its subsequent steps are performed.

When it is determined in the process of step S97 that the fine searching is not performed (step S101), the calculated parameter t* is output as the parameter t indicating the position of the camera 60. As illustrated in FIG. 5, an assumed execution entity executing the online calibration may be the individual user of the HMD 100. In the embodiment, only the rotation relationship of one-axis rotation between the camera 60 and the IMU 71 is used. In another embodiment, however, a rotation relationship of rotation of two or more axes between the camera 60 and the IMU 71 may be used. Even in this case, the spatial relationship between the camera 60 and the IMU 71 can be derived using Expression (18) or (20).

In the HMD 100 according to the embodiment, as described above, the IMU 71 detects data indicating the orientation (ground pose) of the IMU 71 and the IMU 15 detects data indicating the orientation of the IMU 15. The camera 60 imaging an outside scene can change the imaging range relative to the IMU 71 fixed to the mounting structure 90. The calculation section 167 calculates the rotation matrix $R_{marker2cam}$ indicating the spatial relationship between the camera 60 and the identification marker MK1 using the imaged data obtained by the imaging the identification marker MK1 by the camera 60. Then, the calculation section 167 derives the spatial relationship between the camera 60 and the IMU 71 based on the detected data including the orientation of the IMU 71, the detected data including the orientation of the IMU 15, and the spatial relationship between the camera 60 and the identification marker MK1. Since the orientation of the IMU 71 and the orientation of the IMU 15 at the static positions may be obtained, a problem of time synchronization does not occur and calibration of the high precision can be executed compared to the imaging at dynamic positions. By using the angular velocities detected by two IMUs, the IMU 71 corresponding to the image display section 20 and the IMU 15 corresponding to the identification marker MK1 for the execution of the calibration, it is possible to obtain the orientation of high precision in a coordinate axis to be converted. Since the identification marker MK1 disposed on the control section 10 is used in the execution of the calibration, a device other than the HMD 100 is not necessary, and thus convenience for the user is improved.

In the HMD 100 according to the embodiment, the camera 60 can be rotated along the arrow CS1 around one axis and is not rotated around the other axes. Therefore, in the HMD 100 according to the embodiment, the calibration can be executed using a simple expression as in Expression (32), and thus the processes can be performed quickly until a spatial relationship between the camera 60 and the IMU 71 is calculated.

B. Second Embodiment

In a second embodiment, only "A-3-5. Cost Function Optimization Process" of the first embodiment is different. Therefore, a cost function optimization process will be described and the other configurations and process will not be described.

Figure 15:
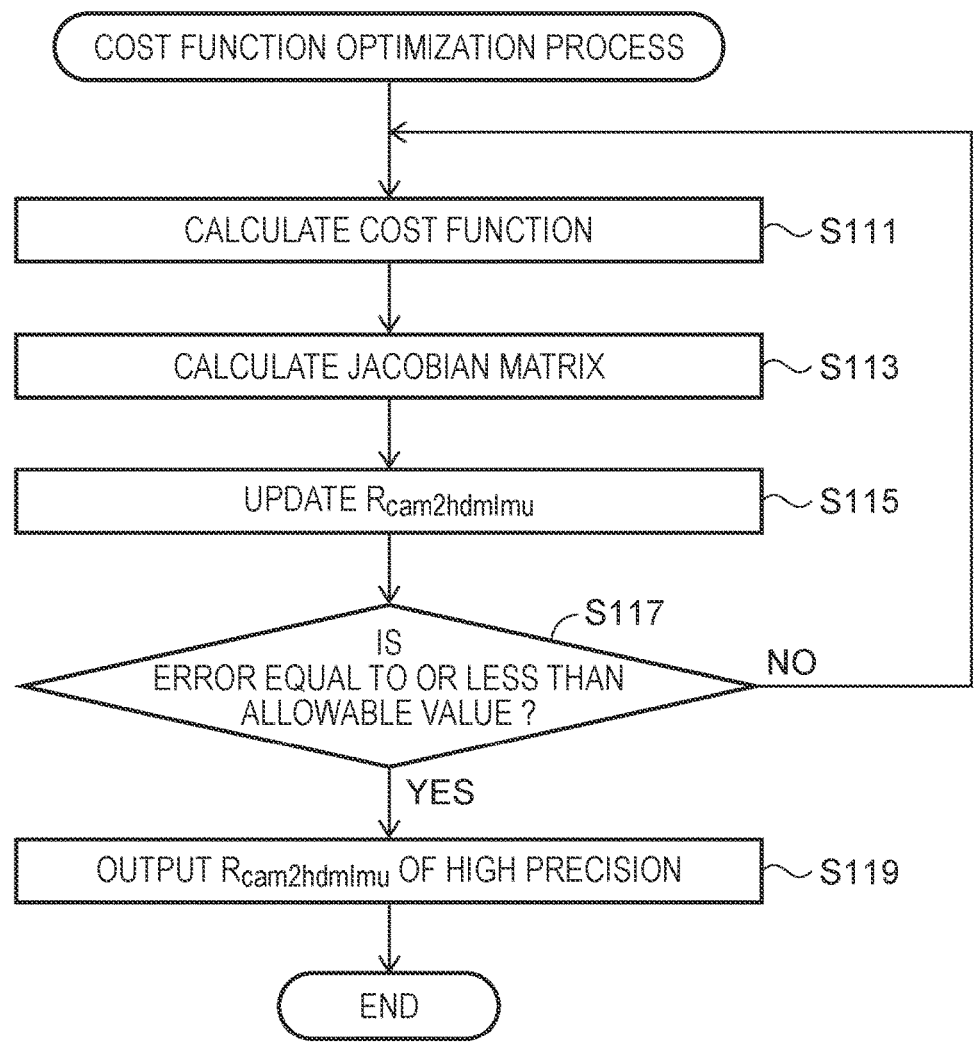
FIG. 15 is a flowchart illustrating a cost function optimization process according to a second embodiment.

FIG. 15 is a flowchart illustrating the cost function optimization process according to the second embodiment. In the second embodiment, a restriction that the orientation of the camera 60 has a value close to the parameter t* is added to further optimize the cost function and nonlinear optimization is performed on the cost function. In the cost function optimization process according to the second embodiment, the calculation section 167 calculates the cost function using the data obtained in the calibration data collection process (FIG. 13) (step S111). The calculation section 167 calculates the Jacobian matrix shown in Expression (23) to Expression (25) (step S113). The calculation section 167 updates the rotation matrix $R_{cam2hmdImu}$ by adding the above-described restriction (step S115). The calculation section 167 determines whether an error obtained from the cost function with the updated rotation matrix $R_{cam2hmdImu}$ is equal to or less than an allowable error set in advance (step S117). When the calculation section 167 determines that the error is greater than the allowable error (NO in step S117), the processes of step 111 and its subsequent steps are repeated. When the calculation section 167 determines in the process of step S117 that the error is equal to or less than the allowable error (YES in step S117), the updated rotation matrix $R_{cam2hmdImu}$ is output as the rotation matrix $R_{cam2hmdImu}$ of high precision (step S119) and the cost function optimization process ends.

C. Third Embodiment

Figure 16:
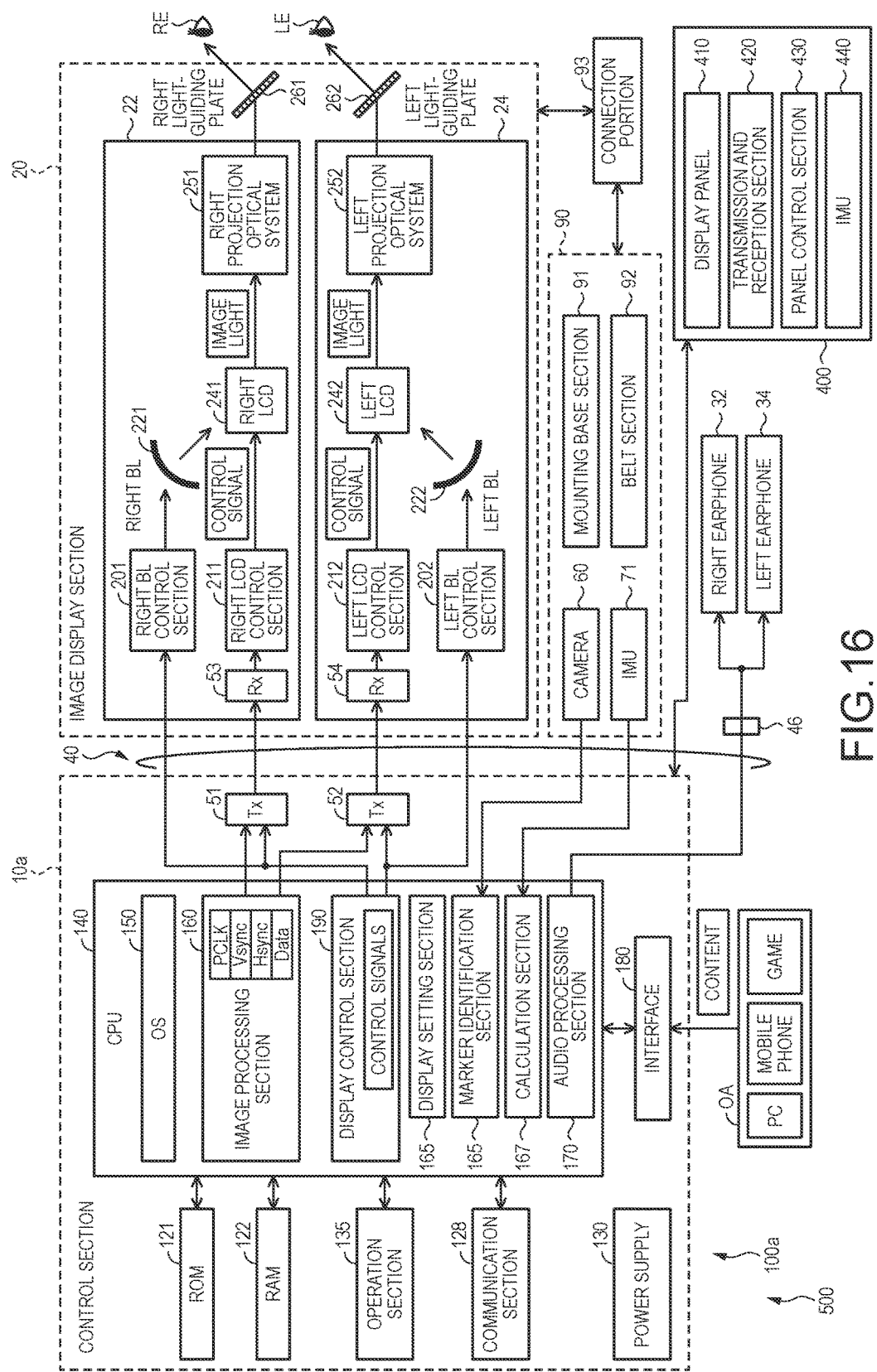
FIG. 16 is a block diagram functionally illustrating an image display system including an HMD according to a third embodiment.

FIG. 16 is a block diagram functionally illustrating an image display system 500 including an HMD 100a according to a third embodiment. In the third embodiment, calibration is executed by displaying an image corresponding to the identification marker MK1 on a display panel of a marker display device 400 which is another device different from the HMD 100 instead of the identification marker MK1 of the first embodiment.

As illustrated in FIG. 16, the image display system 500 includes the HMD 100a and the marker display device 400. The HMD 100a according to the third embodiment has a different configuration of the control section 10a, compared to the HMD 100 according to the first embodiment, and the remaining configurations are the same, and thus the description of the same configuration is omitted. The control section 10a includes a communication section 128 in addition to the configuration of the control section 10 according to the first embodiment and does not include the IMU 15. The communication section 128 can transmit and receive to and from another device. The communication section 128 transmits image data of the identification marker MK1 stored in the ROM 121 to the marker display device 400. The communication section 128 receives information transmitted from another device. In the third embodiment, the communication section 128 and the calculation section 167 correspond to a calculation section in the summary.

The marker display device 400 is a device that includes a display panel 410 capable of displaying an image. Examples of the marker display device 400 include a smartphone and a mobile phone. The marker display device 400 includes a display panel 410, a transmission and reception section 420 capable of transmitting and receiving information to and from another device, a panel control section 430 controlling image display on the display panel 410, and an IMU 440. The transmission and reception section 420 receives image data transmitted from the communication section 128. The panel control section 430 causes the display panel 410 to display a marker image IMG corresponding to the identification marker MK1, using the image data received from the transmission and reception section 420. The IMU 440 is an inertial sensor that detects acceleration, an angular velocity, and geomagnetism of the marker display device 400 in which the IMU 440 is embedded and outputs orientation of the IMU 440. The transmission and reception section 420 transmits the acceleration detected by the IMU 440 and the orientation or the like of the IMU 440 as data to the communication section 128. The communication section 128 receives the detected value of the IMU 440 transmitted from the transmission and reception section 420. The calculation section 167 executes calibration using data from the IMU 440.

In the third embodiment, as described above, the marker image IMG is displayed on the display panel 410 of the marker display device 400 instead of the identification marker MK1 according to the first embodiment. Therefore, when there is a device capable of receiving and displaying the marker image IMG, calibration can be executed even when a user does not carry the marker MK1 as an actual object, and thus convenience for the user is improved.

D. Modification Examples

The invention is not limited to the foregoing embodiments, but can be implemented in various forms within the scope of the invention departing from the gist of the invention. For example, the following modifications are possible.

The identification marker MK1 imaged by the camera 60 is disposed on the rear surface of the control section 10 in the first embodiment and is displayed as the marker image IMG on the display panel 410 in the third embodiment, but various modifications of the form are possible. For example, the identification marker MK1 may be disposed at any portion of a device which can be carried by a user except for the control section 10.

In the first embodiment, the IMU 71 and the IMU 15 detect acceleration, an angular velocity, and geomagnetism, but may detect only acceleration and may not detect an angular velocity or geomagnetism. For example, the IMU 71 and the IMU 15 may be replaced with sensors detecting only acceleration or may detect pressures different from the angular velocity and the geomagnetism.

In the foregoing first embodiment, the camera 60 can be rotated using one axis as the central axis along the arrow CS1 relative to the mounting structure 90, but can also be rotated around other axes. For example, the camera 60 can also be rotated around all of the three axes and may be configured to be translated in a translation direction as well as rotation.

The invention is not limited to the foregoing embodiments and modification examples, but can be implemented with various configurations within the scope of the invention without departing from the gist of the invention. For example, technical features in embodiments and modification examples corresponding to the technical features in the embodiments described in the summary of the invention can be appropriately replaced or combined to achieve some or all of the above-described advantages to resolve some or all of the above-described problems. When the technical features are not described as essential features in the present specification, the technical features can be appropriately deleted.

The entire disclosure of Japanese patent application No. 2015-159484, filed on Aug. 12, 2015, is expressly incorporated by reference herein.

What is claimed is:

1. An image display device comprising:
    a first inertial sensor;
    a camera; and
    a processor configured to calculate a first spatial relationship between the camera and a marker based at least on an image of the marker captured by the camera, the marker being presented by a device having a second inertial sensor movable relative to the first inertial sensor,
    wherein the processor is further configured to calculate a second spatial relationship between the camera and the first inertial sensor based at least on the first spatial relationship, first data and second data, the first data including a first orientation of the first inertial sensor and the second data including a second orientation of the second inertial sensor, the first data and the second data being respectively obtained from the first inertial sensor and the second inertial sensor in the case where the image of the marker is captured by the camera.

2. An image display device according to claim 1, further comprising:
    a first memory area that stores the first data;
    a second memory area that stores the second data; and
    a third memory area that stores the first spatial relationship,
    wherein the processor is configured to calculate the second spatial relationship using the first data stored in the first memory area, the second data stored in the second memory area, and the first spatial relationship stored in the third memory area.

3. An image display device according to claim 1, further comprising:
    wherein the camera captures the image of the marker and the processor is configured to obtain the first data and the second data respectively from the first inertial sensor and the second inertial sensor in the case where the processor determines that the first inertial sensor and the second inertial sensor are in a static condition based on outputs from the first inertial sensor and the second inertial sensor, and
    wherein the processor is configured to calculate the second spatial relationship based at least on the first data, the second data, and the first spatial relationship obtained by capturing the image of the marker.

4. An image display device according to claim 3, further comprising:
    a memory section that stores a third spatial relationship between the marker and the second inertial sensor,
    wherein the processor is configured to calculate the second spatial relationship based at least on the first data, the second data, the first spatial relationship, and the third spatial relationship.

5. An image display device according to claim 3, further comprising:
    a memory section that stores a third spatial relationship between the marker and the second inertial sensor,
    wherein the processor is configured to obtain the first data including the first orientation and a first acceleration measured by the first inertial sensor and the second data including the second orientation and a second acceleration measured by the second inertial sensor in the case where the processor determines that the first inertial sensor and the second inertial sensor are in the static condition, and
    wherein the processor is configured to calculate the second spatial relationship based at least on the first acceleration, the first orientation, the second acceleration, the second orientation, the first spatial relationship, and the third spatial relationship.

6. An image display device according to claim 1,
    wherein the camera is disposed in a structure so that pivotal movement of the camera around a predetermined one axis is enabled and pivotal movement of the camera around two other axes perpendicular to the predetermined one axis is prohibited.

7. A non-transitory computer readable medium storing a program implementable by a computer in an image display device including a first inertial sensor that detects an acceleration and a camera that captures an image of an outside scene,
    the computer program causing the computer to realize functions of:
    calculating a first spatial relationship between the camera and a marker based at least on an image captured by the camera, the marker being presented by a device having a second inertial sensor movable relative to the first inertial sensor, and
    calculating a second spatial relationship between the camera and the first inertial sensor based at least on the first spatial relationship, first data and second data, the first data including a first orientation of the first inertial sensor and the second data including a second orientation of the second inertial sensor, the first data and the second data being respectively obtained from the first and second inertial sensors in the case where the image of the marker is captured by the camera.

8. An image display system that has a head-mounted display device and a display device that displays an image of a marker,
the head-mounted display device comprising:
a first inertial sensor;
a camera; and
a processor,
the display device comprising:
a second inertial sensor,
wherein the processor is configured to calculate a first spatial relationship between the marker and the camera based at least on an image of the marker captured by the camera, the marker being displayed by the display device based on data of the marker, and
wherein the processor is configured to calculate a second spatial relationship between the camera and the first inertial sensor based at least on the first spatial relationship, first data and second data, the first data including a first orientation of the first inertial sensor and the second data including a second orientation of the second inertial sensor, the first data and the second data being respectively obtained from the first inertial sensor and the second inertial sensor in the case where the image of the marker is captured by the camera.

* * * * *